US009007388B1

(12) United States Patent
Cook et al.

(10) Patent No.: US 9,007,388 B1
(45) Date of Patent: Apr. 14, 2015

(54) CACHING ATTRIBUTES OF SURFACES WITHOUT GLOBAL PARAMETERIZATIONS

(75) Inventors: Robert L. Cook, San Anselmo, CA (US); Peter-Pike Sloan, Cottonwood Heights, UT (US); Manuel Kraemer, Oakland, CA (US); Pitchaya Sitthi-Amorn, Waltham, MA (US)

(73) Assignee: Pixar, Emeryville, CA (US)

( * ) Notice: Subject to any disclaimer, the term of this patent is extended or adjusted under 35 U.S.C. 154(b) by 901 days.

(21) Appl. No.: 13/190,469

(22) Filed: Jul. 25, 2011

Related U.S. Application Data

(63) Continuation-in-part of application No. 11/861,634, filed on Sep. 26, 2007, now Pat. No. 8,189,006.

(60) Provisional application No. 60/827,273, filed on Sep. 28, 2006.

(51) Int. Cl.
*G09G 5/00* (2006.01)
*G06T 11/20* (2006.01)
*G06T 7/00* (2006.01)

(52) U.S. Cl.
CPC .............. *G06T 11/203* (2013.01); *G06T 7/0083* (2013.01)

(58) Field of Classification Search
CPC . G06T 11/203; G06T 2200/12; G06T 7/0083; G06T 2200/08
USPC .......... 345/604, 615, 581, 582, 585, 606, 611; 382/266, 154, 199
See application file for complete search history.

(56) References Cited

U.S. PATENT DOCUMENTS

| | | | |
|---|---|---|---|
| 5,903,273 A | 5/1999 | Mochizuki et al. |
| 6,037,949 A | 3/2000 | DeRose et al. |
| 6,222,553 B1 | 4/2001 | DeRose et al. |
| 6,448,968 B1 | 9/2002 | Pfister et al. |
| 6,489,960 B2 | 12/2002 | DeRose et al. |
| 6,553,337 B1 | 4/2003 | Lounsbery |
| 6,583,787 B1 | 6/2003 | Pfister et al. |
| 7,227,545 B2 | 6/2007 | Maillot et al. |

OTHER PUBLICATIONS

Collier, The quasi-uniformity condition and three-dimensional geometry representation as it applies to the reproducing kernel element method, 2009.*

* cited by examiner

*Primary Examiner* — Jeffrey Chow
(74) *Attorney, Agent, or Firm* — Kikpatrick Townsend & Stockton LLP

(57) ABSTRACT

Surfaces without a global surface coordinate system are divided into surface regions having local surface coordinate systems to enable the caching of surface attribute values. A surface attribute value for a surface region may include contributions from two or more adjacent surfaces. Sample points may be arranged at the corners, rather than centers, of surface regions and include prefiltered values based on two or more surfaces. A renderer may sample the surface attribute function using these prefiltered values without accessing any adjacent surfaces, even if the renderer's filter crosses a surface boundary. A multiresolution cache stores surface attribute values at different resolution levels for surface regions of one or more surfaces, which may be discontiguous. Two or more resolution levels may have the same number of sample points but have values based on filters with different areas and spatial frequency limits. Resolution levels may be selected based on geodesic distance on a surface.

27 Claims, 17 Drawing Sheets

| A01 | A10 564 | B01 562 | B10 | C01 | C10 |
|---|---|---|---|---|---|
| A00 | A11 566 | B00 | B11 | C00 | C11 |

560

4 X 4 SURFACE REGIONS
4 X 4 SAMPLE POINTS

CACHING ATTRIBUTES OF SURFACES WITHOUT GLOBAL PARAMETERIZATIONS

CROSS-REFERENCE TO RELATED APPLICATIONS

This application is a continuation-in-part of U.S. patent application Ser. No. 11/861,634, filed Sep. 26, 2007 now U.S. Pat. No. 8,189,006, and entitled "CACHING ATTRIBUTES OF SURFACES WITHOUT GLOBAL PARAMETERIZATIONS," which claims priority to U.S. Provisional Patent Application No. 60/827,273, filed Sep. 28, 2006, which is incorporated by reference herein for all purposes. This patent application is related to U.S. Pat. No. 6,037,949, issued Mar. 14, 2000, and entitled "Texture mapping and other uses of scalar fields on subdivision surfaces in computer graphics and animation"; U.S. Pat. No. 6,222,553, issued Apr. 24, 2001, and entitled "Hybrid subdivision in computer graphics "; and U.S. Pat. No. 6,489,960, issued Dec. 3, 2002, and entitled" Hybrid subdivision in computer graphics." These related patents are incorporated by reference herein for all purposes.

BACKGROUND OF THE INVENTION

The present invention relates to the field of computer graphics, and in particular to methods and apparatus for optimizing the evaluation of functions associated with surfaces. Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Surface attribute functions can define the values of attributes of surfaces in three-dimensional space. Surface attribute functions can be evaluated at any point on the surface to provide corresponding attribute values at that point on the surface. Attributes of surfaces can include optical properties of a surface, such as color, transparency, reflectivity, and refractivity. Attributes can also include visibility or occlusion information; artistically or procedurally generated texture data in one, two, three, or more dimensions; noise functions in one, two, three, or more dimensions, which can be used to procedurally generate or modify other surface attributes; shadow generation information; forces or attributes used for physics, cloth, fluid, or other types of simulations; animation data, which can be used to specify motion of entities associated with a surface point, such as fur or hair; modeling parameters, such as the density of procedurally generated grass applied to a model of a landscape; geometric features of a surface, such as displacement, normal, parallax, and bump maps; illumination information, which specifies the amount and direction of light on the surface point from other portions of the scene; and rendering information, such as ray tracing path information or radiosity rendering information. Functions can be relatively simple, such as looking up texture data from a texture map, or very complex, such as the evaluation of complex user-defined shader programs, ray tracing programs, animation or modeling programs, or simulation programs. Surface attribute functions can output scalar values, vector values, and/or n-tuple values, where n is any arbitrary positive integer.

An application such as a rendering, animation, or simulation application determines the attribute values of a given surface point by evaluating the associated surface attribute functions. Typically, this evaluation requires the specification of the position of the given surface point using surface coordinates. For attributes values that remain fixed to surface points regardless of the surface's pose (or position, orientation, and shape), attribute values for surface points can be cached or stored. This eliminates redundant evaluations of surface attribute functions and decreases the time required for rendering or other operations utilizing surface point attribute values.

Surfaces for three-dimensional models are defined by mathematical relationships. The mathematics defining some types of surfaces, such as polygons and bicubic patches, have a natural global surface coordinate system. The global surface coordinate system enables the position of any surface point to be specified as a set of numerical values, such as a pair of coordinates values (u,v).

The mathematics defining other types of surfaces do not include a global surface coordinate system. For these surfaces, there is no coordinate system within or on the surface itself that can define the position of any surface point as a set of numerical values. Examples of these types of surfaces include subdivision surfaces, implicit surfaces, and fractal surfaces.

Subdivision surfaces can create piecewise smooth surfaces out of arbitrary meshes of points. From an initial mesh of points, additional sets of points are added to provide additional surface detail and form a smoother surface, in a process referred to as refinement. The repeated application of refinement operations produces a hierarchy of progressively more detailed meshes, which ultimately converge at its limit to a subdivision surface. There are numerous subdivision surface refinement schemes that are well known in the art. Subdivision surfaces have many advantages in modeling three-dimensional objects, including modeling piecewise smooth surfaces of arbitrary topology and sharp features, edges, creases, and corners. However, because the surface is the result of the progressive refinement of a set of arbitrary meshes, there is no single surface coordinate system, or coordinate system located within the subdivision surface, that can specify the location of any given point on the subdivision surface.

Implicit surfaces are surfaces defined by an isosurface of a function of three or more dimensions. An isosurface is the set of function solutions having a constant, specified value. For example, if a function defines the pressure of fluid in a three-dimensional flow, an implicit surface can be specified as the set of function values in the three-dimensional flow having a given pressure value. Other types of functions can be used to define implicit surfaces, including the signed distance function often used to define level sets. With implicit surfaces, the implicit surface is deduced from the output of a more complex function of three or more dimensions. Because there is no explicit mathematical equation defining the implicit surface itself, there is no surface coordinate system, or coordinate system within the implicit surface, that can specify the location of any given point on the implicit surface.

Because some types of surfaces, including but not limited to subdivision surfaces, implicit surfaces, and fractal surfaces, do not have a natural global surface coordinate system, which is a coordinate system within or on the surface that is capable of specifying the location of any point on the surface as a set of numerical values, other techniques must be used to evaluate surface attribute functions.

For example, the position of a surface point can be determined in three-dimensional space. Using this three-dimensional position of a surface point, the surface attribute functions can be evaluated to determine the surface attribute values. Even if the attribute values are fixed to the surface, the surface attribute functions for a point on the surface must be evaluated repeatedly because the position of a surface point in three-dimensional space changes as the surface's pose changes, even if the relative location of the surface point within a surface remains unchanged. Additionally, surfaces are often sampled at a rate based on the viewpoint or camera parameters used to render a scene. As the camera or viewpoint changes, the surface points that are sampled and hence evaluated by surface attribute functions change as well. Thus, it is difficult to cache attributes of surface points for these surface types.

One prior approach caches surface attribute values for surfaces without global surface coordinate systems in a three dimensional data structure. In this approach, a data structure such as a voxel grid or brick map stores surface attribute values at the three-dimensional locations corresponding with the locations of their associated surface points. The three-dimensional data structures include significant amounts of empty space, corresponding to the three-dimensional space not occupied by the surface of an object. Even with compression schemes, these data structures require enormous amounts of memory and are difficult to use effectively.

Altasing is another prior approach that attempts to superimpose or project a global surface coordinate system over multiple surfaces that do not have their own surface coordinate system. The global coordinate system provided by atlasing schemes behaves poorly for complex surface topologies and at the seams between surfaces, having numerous gaps, discontinuities, and inconsistencies.

It is therefore desirable for a system and method to enable caching of surface attribute values for surfaces without global surface coordinate systems. It is further desirable for the system and method to enable the retrieval of cached surface attribute values without reevaluating surface attribute functions. It is further desirable for the system and method to efficiently store cached surface attribute values with minimal wasted memory.

BRIEF SUMMARY OF THE INVENTION

An embodiment of the invention divides surfaces without a global surface coordinate system into surface regions having local surface coordinate system to enable the caching and retrieval of surface attribute values. Surface attribute functions are evaluated to determine surface attribute values for the surface regions. A surface attribute value for a surface region can include the contribution of the surface attribute function to one, two, or more adjacent surfaces. A multiresolution cache stores surface attribute values at different resolution levels for surface regions of one or more surfaces, which may be discontiguous. Surface attribute values for a surface are retrieved from the multiresolution cache by dividing the surface into surface regions at a desired resolution level. A corresponding resolution level of the multiresolution cache is selected and one or more cached surface attribute values are retrieved for each surface region. Surface attribute values can be artistically or procedurally generated or generated from a rendering operation and can include optical, illumination, animation, simulation, modeling, or rendering attributes.

In an embodiment, a method of caching a value of a function at a plurality of surface points comprises dividing a first surface portion of at least one surface into a first plurality of surface regions at a first resolution level and dividing the first surface portion into a second plurality of surface regions at a second resolution level. The method further comprises evaluating a function to determine a surface attribute value for each of the first plurality of surface regions and evaluating the function to determine a surface attribute value for each of the second plurality of surface regions. The surface attribute values for the first and second plurality of surface regions are stored in a first portion and second portions of a multiresolution cache, respectively. Each of the first and second pluralities of surface regions include a separate local surface coordinate system and the first surface portion does not include a global surface coordinate system.

In a further embodiment, dividing the first surface portion into the first plurality of surface regions comprises an ordering scheme adapted to specify the first plurality of surface regions in a consistent order. The surface attribute values for the first plurality of surface regions are stored in storage locations corresponding with the consistent order.

In an additional embodiment, the method applies a filtering function having a filter area to each of the surface regions, wherein the filtering function is adapted to combine surface attribute values from the function within the filter area. In yet a further embodiment, the filter area includes surface attribute values for at least one surface region associated with at least two adjacent surfaces.

Embodiments of the first surface portion can include a subdivision hierarchy of meshes converging at its limit to a subdivision surface, an implicit surface defined by an isosurface of a second function, and a fractal surface. Further embodiments of the first surface portion can include a single surface or multiple surfaces. The multiple surfaces may be discontiguous.

BRIEF DESCRIPTION OF THE DRAWINGS

The invention will be described with reference to the drawings, in which.

DETAILED DESCRIPTION OF THE INVENTION

Figure 1:
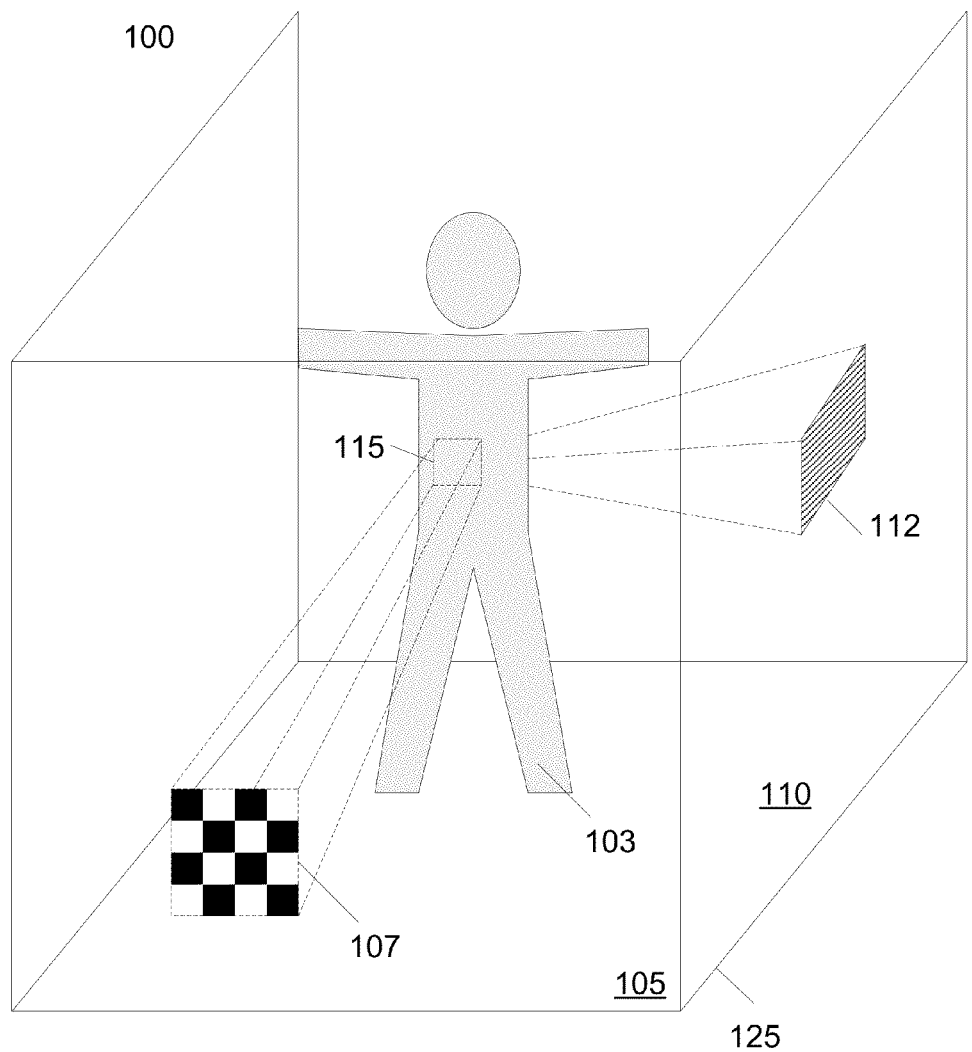
FIG. 1 illustrates an example application of a surface attribute function.

FIG. 1 illustrates an example application of a surface attribute function 100 to a three-dimensional model 103. Example surface attribute function 100 is a projection paint function. A projection paint function can be used to apply surface color attributes, for example in the form of texture maps, to a three-dimensional model 103. The three-dimensional model can be defined using any technique known in the art for representing three-dimensional objects, including surfaces without a global surface coordinate system, such as subdivision surfaces, implicit surfaces, and fractal surfaces.

In example surface attribute function 100, a set of views 125 of a three-dimensional model 103 in an initial or rest pose is provided. For example, the set of views 125 includes front view 105 and side view 110 of model 103. Typically, the set of views 125 includes at least six views of model 103. The set of views 125 can include additional views arranged such that every portion of the model 103 is visible from at least one of the set of views 125. The model 103 may also be posed in additional poses, referred to as reference poses, to ensure that every portion of the model 103 is visible from at least one of the set of views 125.

For each view, an image specifies surface color values for at least a portion of the model visible from the view. For example, image 107 specifies surface color values for view 105 of the model 103. Similarly, image 112 specifies surface color values for view 110 of the model 103. An artist or other user can define images for each view using any technique for creating two-dimensional images known in the art, including the use of image editing applications. Each pixel or other portion of an image in a view specifies the surface color of a corresponding surface of the model 103 as projected into that view. For example, portion 115 of model 103 as projected into view 105 corresponds with image 107. Additionally, each view can include a shadow or depth map specifying the distance of the surface of the model 103 relative to the viewpoint associated with each view. The depth map is used to determine occlusion of other surfaces of model 103 that are not visible from its associated view.

Figure 2:
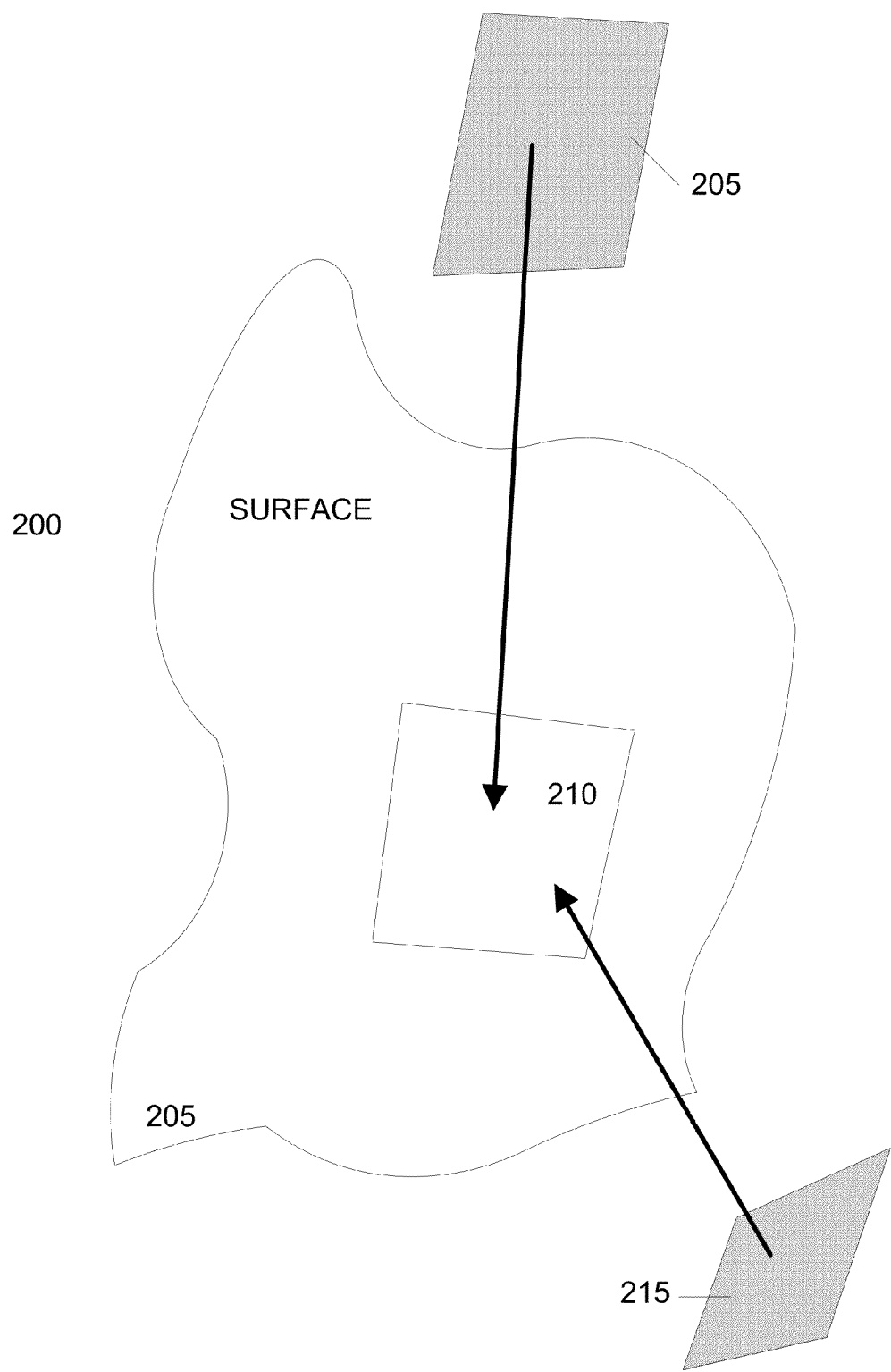
FIG. 2 illustrates a prior method for evaluating a example projection paint function for a surface without a global surface coordinate system.

During rendering, the model is posed from its rest pose to a desired pose. FIG. 2 illustrates a prior method 200 for evaluating a example projection paint function for a surface 205 without a global surface coordinate system. The surfaces of model 103 in the desired pose, such as surface 205, are divided or partitioned into small surface regions, such as sub-pixel size micropolygons or other samples of a surface. Surface region 210 is an example of these surface regions. The position of surface region 210 in three-dimensional space is determined.

Each surface region, such as surface region 210, includes transformation information that specifies a transformation from the position of the surface region in the desired pose to a corresponding position, in three-dimensional space, in the rest pose and any additional reference poses. The transformation information is applied to a surface region 210 to determine its corresponding positions in the rest pose and any additional reference poses.

For the rest pose and any additional reference poses, images from each view are projected onto surface region in its respective transformed positions. For example, image 215 and 205 are projected on to surface region 210. If the depth of the surface region relative to the associated view is greater than the corresponding value of the depth map, indicating that the surface region is occluded in this view, the image associated with this view is not included in the color values of the transformed surface region.

The color values of the projected images from each view of each reference or rest pose onto the transformed surface region are combined and blended. Color values from multiple views associated with the rest pose and any additional reference poses can be combined in blended in numerous different ways, including weighted or unweighted averages or more complex filtering operations. Additionally, a feathering operation can be applied to the projected images associated with different views to ensure that surface regions near the boundaries of two or more projected images do not show any visible seams or gaps. The color values of the surface region are the combination of projected color values for each view of each reference or rest pose onto the surface region.

Method 200 of evaluating projection paint functions, as well as other types of surface attribute functions, often must be repeated each time the surface is rendered. For example, the position of the surface point in three-dimensional space relative to the camera viewpoint changes as the surface's pose changes and/or the camera viewpoint changes. Many computer graphics and rendering operations sample, filter, or otherwise evaluate surface attribute functions based on the relative size of the surface attribute function when projected into the image plane of the camera viewpoint (or the size of a pixel or sub-pixel region when projected on to the surface). For example, a projection paint function may be sampled using a filter that is the size of a pixel in an image when projected into the image plane. As a surface changes its pose and/or the camera viewpoint changes, the sampling rate and filter used to evaluate a projection paint function changes. Thus, method 200 must be repeatedly evaluated to sample the surface attribute function with the appropriate sample rate and filter size as a surface is posed.

Figure 3:
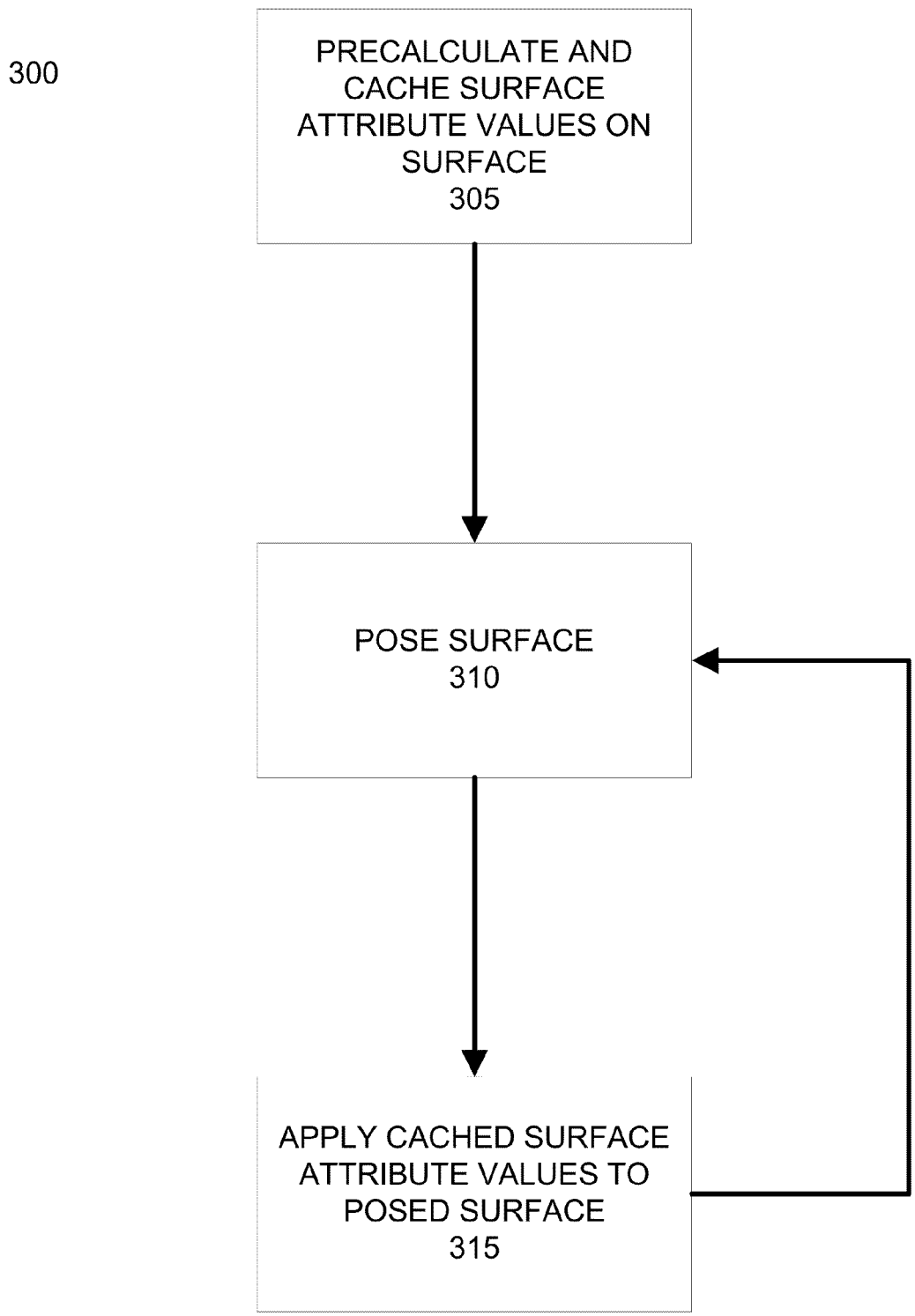
FIG. 3 illustrates a method of precalculating, caching, and reusing surface attribute values for a surface without a global surface coordinate system according to an embodiment of the invention.

FIG. 3 illustrates a method 300 of precalculating, caching, and reusing surface attribute values for a surface without a global surface coordinate system according to an embodiment of the invention. Method 300 enables surface attribute values for surfaces without a global surface coordinate system to be calculated once and then reused as needed during rendering or other operations, even if the surface is sampled at different rates.

Step 305 precalculates and caches surface attribute values for a surface. As discussed in detail below, the surface attribute values for a surface are stored in a multiresolution cache data structure. In step 310, the surface is placed into an arbitrary target pose. The target pose can be specified by animation variables, deformer functions, control points, or any other technique known in the art for specifying the position, orientation, and shape of surfaces.

Step 315 applies surface attribute values stored in the multiresolution cache to the posed surface. Step 315 and optionally step 310 can be repeated any number of times, reusing the surface attribute values stored in the multiresolution cache. The surface attribute values of the multiresolution cache will be valid as long as the outputs of the surface attribute function do not change for a surface. For example, a surface attribute function's values may be constant over an interval of time. Depending on the application, surface attribute values may be constant only within the time interval of a single frame or constant over a time interval of multiple frames. An additional embodiment can use cached surface attribute values to approximate a surface attribute function that changes only slightly over time between frames. In a further embodiment, a first surface attribute function can be analyzed to determine a subfunction with surface attribute values suitable for caching in the multiresolution cache. The cached subfunction surface attribute values can be reused together with one or more additional subfunctions to reconstruct the first surface attribute function.

Figure 4:
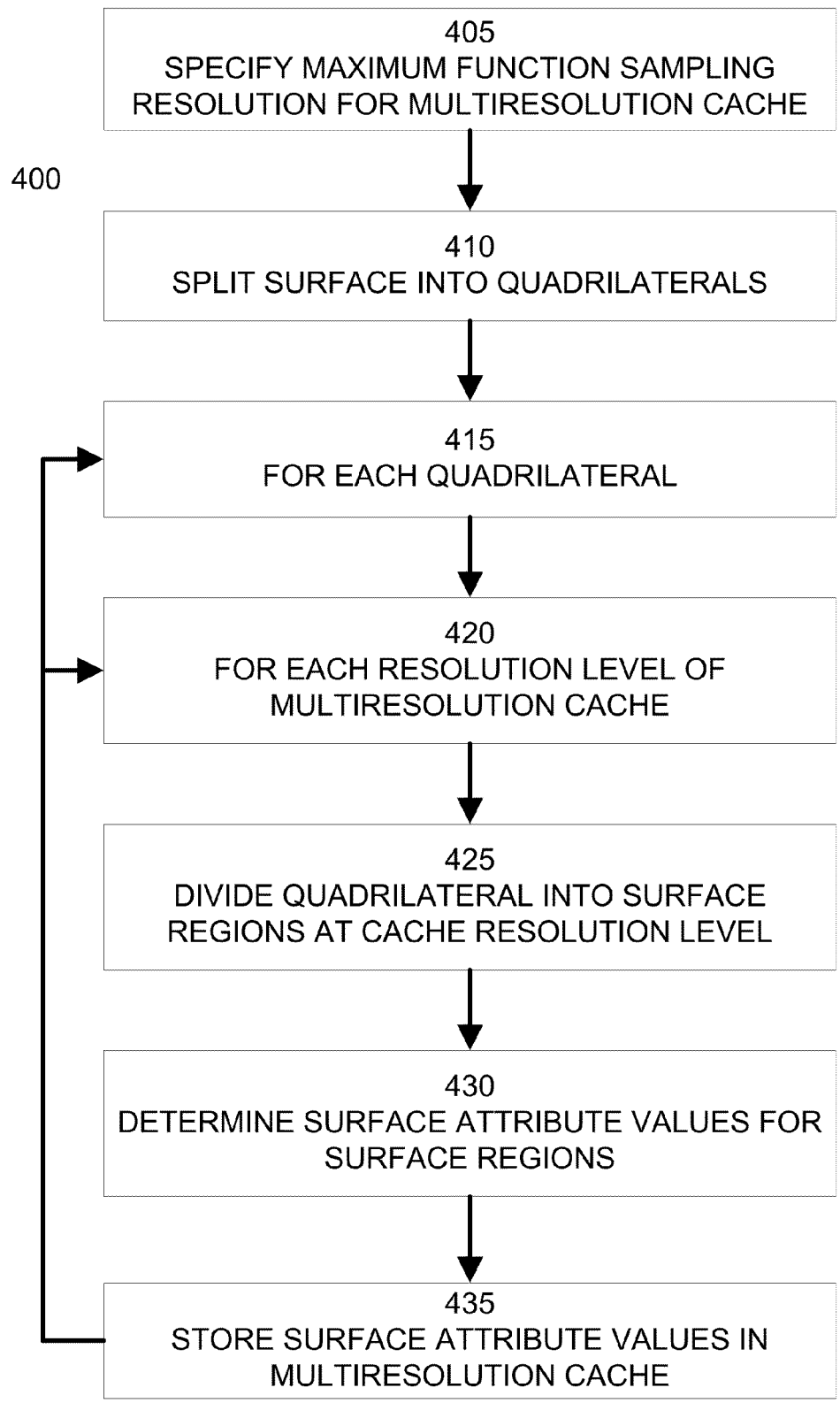
FIG. 4 illustrates a method of precalculating and caching surface attribute values for a surface without a global surface coordinate system according to an embodiment of the invention.

FIG. 4 illustrates a method 400 of precalculating and caching surface attribute values for a surface without a global surface coordinate system according to an embodiment of the invention. Step 405 specifies a maximum sampling resolution for a surface attribute function. The maximum sampling resolution specifies an anticipated maximum sampling rate to be used in rendering or otherwise evaluating the surface attribute function. The maximum surface resolution provides an upper limit on the amount of detail to be sampled from the surface attribute function. In a further embodiment, the maximum sampling resolution can be rounded to a computationally convenient value, such as the nearest power of two.

In an embodiment, step 405 specifies the maximum sampling resolution based on a spectral characteristic of the surface attribute function. For example, if the surface attribute function is a projection paint function, then the maximum sampling resolution can be based on the maximum image resolution used by projection paint function. In an embodiment, the maximum sampling resolution corresponds with the minimum size of image pixels projected on to the surface by the projection paint function.

In another embodiment, the attributes of a filtering function that is used to combine and weight surface attribute values from one or more surface regions determines the maximum sampling resolution.

Based on the maximum sampling resolution, step 405 defines a multiresolution cache data structure having one or more resolution levels. In an embodiment, the resolution levels range from a single sample of the surface attribute function up to the maximum sampling resolution. In an embodiment, each resolution level has double the number of samples in each dimension as the next lowest level. For example, if the lowest resolution level of a multilevel cache has a single sample, the next highest level will have a width and height of two samples each, for a total of four samples in this resolution level. The next highest resolution level will have a width and height of four samples each, for a total of sixteen samples. In this embodiment, the dimensions of each resolution level of the multiresolution cache are progressively doubled up to the maximum sampling resolution.

Step 410 divides the surface into quadrilaterals. Step 410 can utilize any technique known in the art to subdivide surfaces into quadrilaterals. In an embodiment, a subdivision surface is divided into faces having three or more sides. Each face is then divided into quadrilaterals. Each quadrilateral has its own local surface coordinate system.

Step 415 selects one of the quadrilaterals of the surface for processing. Step 420 selects one of the resolution levels of the multiresolution cache for evaluation with the selected quadrilateral.

Step 425 divides the selected quadrilateral into surface regions corresponding with the selected cache resolution level. Surface regions can be defined as sub-pixel size micropolygons or other samples of a surface. For example, if the selected cache resolution level has sixteen samples each in width and height, for a total of 256 samples, then the selected quadrilateral is divided into a corresponding arrangement of 256 surface regions.

In a further embodiment, step 425 divides the selected quadrilateral according to an ordering scheme that is consistent regardless of changes in the position, orientation, or shape of the surface. This ordering scheme will always create surface regions from the quadrilaterals in the same order. As a result, surface regions can be identified by the order in which they are created, enabling surface regions to be correctly identified during subsequent retrievals of previously stored surface attribute values. In an alternate embodiment, step 425 assigns a unique identification to each surface region using another algorithm that is capable of consistently assigning the same identification to a surface region regardless of the position, orientation, or shape of the surface.

Step 430 evaluates one or more surface attribute functions for each surface region. The surface attribute functions for each surface region can be evaluated in any manner typically used to evaluate surface attribute functions during rendering or other processing. For example, if the surface attribute function is a projection paint function, images associated with one or more views of one or more reference poses can be projected onto the surface region and combined to determine a color attribute value for a surface region. Surface attribute functions may utilize the position, normal, tangent, or any other geometric property of the surface itself at the point of evaluation as well artistically or procedurally generated data to determine surface attribute values for the surface regions. Surface attributes may include provide optical properties of a surface, such as color, transparency, reflectivity, specularity, and refractivity; visibility or occlusion information; artistically or procedurally generated texture data and noise data in one, two, three, or more dimensions; shadow generation information; simulation forces or attributes; animation data; modeling data; illumination information; and ray tracing path information.

Step 435 stores the surface attribute values for the surface regions of the selected resolution level of the selected quadrilateral in the multiresolution cache. In an embodiment, the multilevel cache includes storage for a set of arrays of surface attribute values, each array corresponding with the surface attribute values at each resolution level for at least one quadrilateral of the surface. In a further embodiment, each quadrilateral includes a unique identification within a surface. This identification is used to assign surface attribute values to the appropriate storage location of the multiresolution cache. As discussed in detail below, the unique identification associated with a quadrilateral of a surface is also used to retrieve previously stored surface attribute values from the multiresolution cache. In a further embodiment, the ordering scheme used to divide quadrilaterals into surface regions is used to assign surface attribute values for a quadrilateral to storage locations within the multiresolution cache.

Following step 435, steps 420 to 435 are repeated as many times as necessary to determine and store surface attribute values for the selected quadrilateral at all of the resolution levels of the multiresolution cache. Once the surface attribute values at all resolution levels of the multiresolution cache have been determined for the selected quadrilateral, steps 415 to 435 are repeated to determine and store surface attribute values at all resolution levels for all of the quadrilaterals of the surface. In additional embodiments, method 400 can be repeated to determine and store surface attribute values for additional surfaces of one or more three-dimensional models.

Figure 5A:
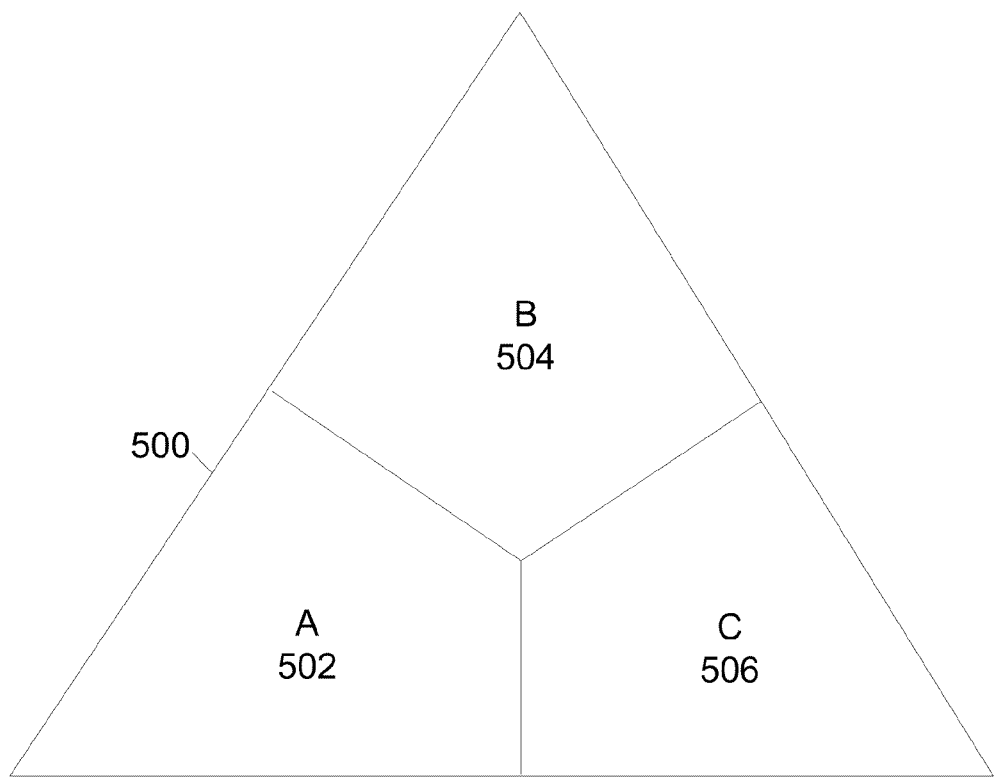
FIGS. 5A-5D illustrate caching surface attribute values of an example subdivision surface according to an embodiment of the invention.

FIGS. 5A-5D illustrate caching surface attribute values of an example subdivision surface according to an embodiment of the invention. FIG. 5A illustrates an example surface 500. Example surface 500 is divided into three quadrilaterals: A 502; B 504; and C 506. At the lowest resolution level of the multiresolution cache, the surface attribute function is sampled once for each quadrilateral.

Figure 5B:
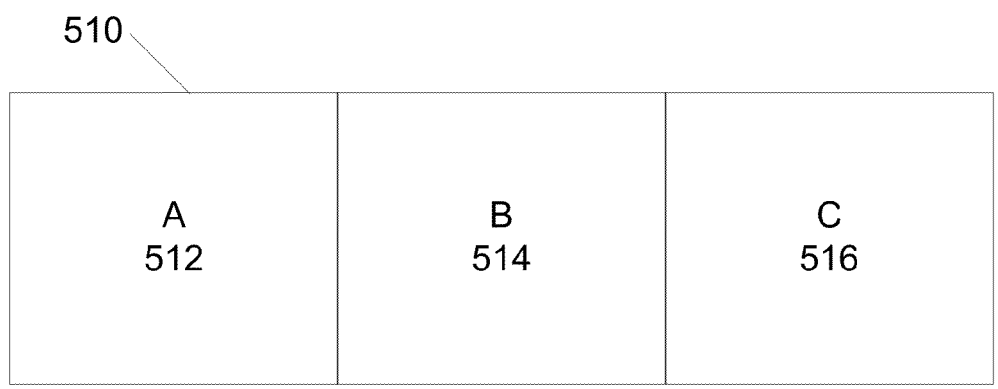

FIG. 5B illustrates the lowest resolution level 510 of a multiresolution cache for example surface 500. Resolution level 510 includes surface attribute values 512, 514, and 516, which correspond with a single sample of the surface attribute function from each of quadrilaterals A 502, B 504, and C 506, respectively. In an embodiment, surface attribute values from two or more quadrilaterals at the same resolution level can be stored in the same resolution level of a single multiresolution cache. For surfaces with a large number of quadrilaterals, this embodiment substantially reduces the overhead associated with managing large numbers of separate multiresolution caches.

Figures 5C, 5D:
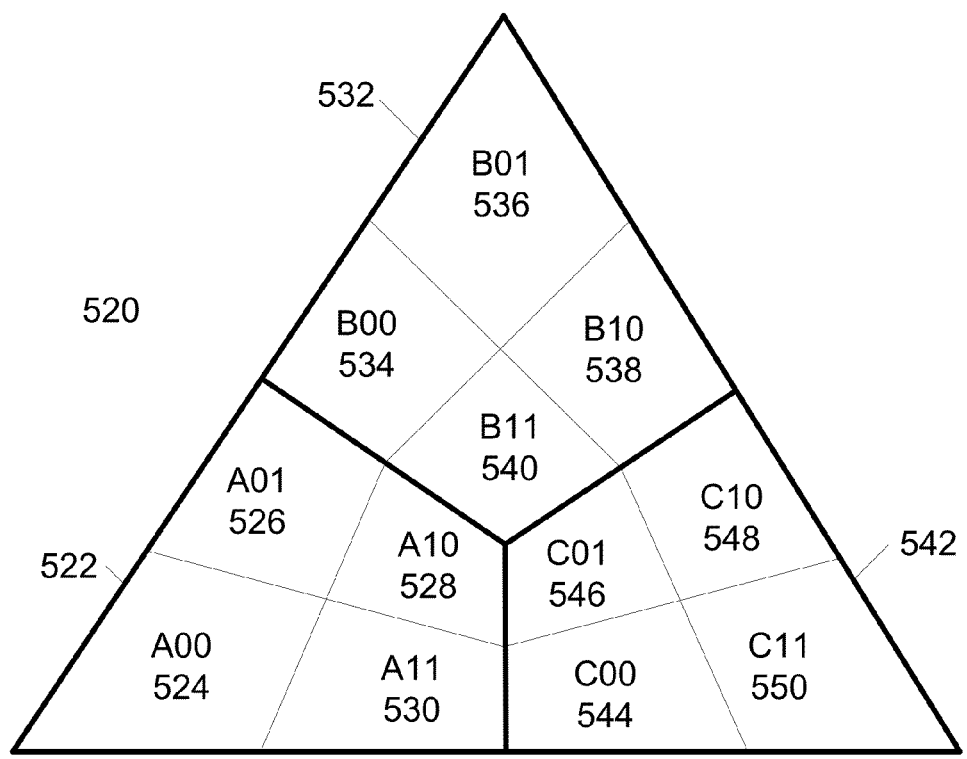

FIG. 5C illustrates example surface 520. Surface 520 corresponds with surface 500 in FIG. 5A. However, in FIG. 5C, the quadrilaterals of surface 520 are being sampled at the next highest resolution level. In this example, surface 520 is sampled with four samples per quadrilateral. Thus, quadrilateral A 522 is divided into surface regions A00 524; A01 526; A10 528; and A11 530. Similarly, quadrilateral B 532 is divided into surface regions B00 534; B01 536; B10 538; and B11 540. Quadrilateral C 542 is divided into surface regions C00 544; C01 546; C10 548; and C11 550.

At this resolution level, the surface attribute function associated with surface 520 is evaluated for each of the four samples for each of the quadrilaterals 522, 532, and 542. A total of twelve surface attribute values in this example are stored in the next resolution level of the multiresolution level. FIG. 5D illustrates the next resolution level 560 of the multiresolution cache. As before, an embodiment of the multiresolution cache stores surface attribute values calculated from all three quadrilaterals at the same resolution in a single resolution level of the multiresolution cache.

It should be noted that each surface attribute value stored in the multiresolution cache is associated with a single, fixed surface region of the surface. Additionally, surface attribute values that are contiguous in the multiresolution cache are not necessarily contiguous on the surface itself or even from contiguous surfaces. For example, surface attribute value B01 562 in resolution level 560 of the multiresolution cache is contiguous with surface attribute values A10 564 and A11 566. However, in surface 520, corresponding surface region B01 536 is not contiguous with surface regions A10 528 and A11 530. Additionally, the multiresolution cache can include surface attribute values from more than one surface. Additionally, the surface attribute values stored at each resolution level, such as the surface attribute values stored in resolution level 560, may be derived from different subdivision levels or levels of detail of their respective surfaces.

Method 400 is capable of simplifying the evaluation of surface attribute functions from a global operation, dependent upon the relationships between numerous surface regions, to a local operation confined to each surface region. In a further embodiment, the method 400 can determine the surface attribute value for a selected surface region by sampling surface attribute values within the selected surface region and optionally those within adjacent surface regions. As a result, the cached surface attribute value for a surface region includes the influence of adjacent surface regions on a selected surface region. When the surface attribute value for the selected surface region is later retrieved from the multiresolution cache for reuse during rendering or other operations, there is no need for further consideration of the influence of adjacent surface regions, as their influence, if any, has already been accounted for. Moreover, rendering and other operations evaluating the surface region may not require any information about the arrangement of adjacent surface regions.

Figure 6:
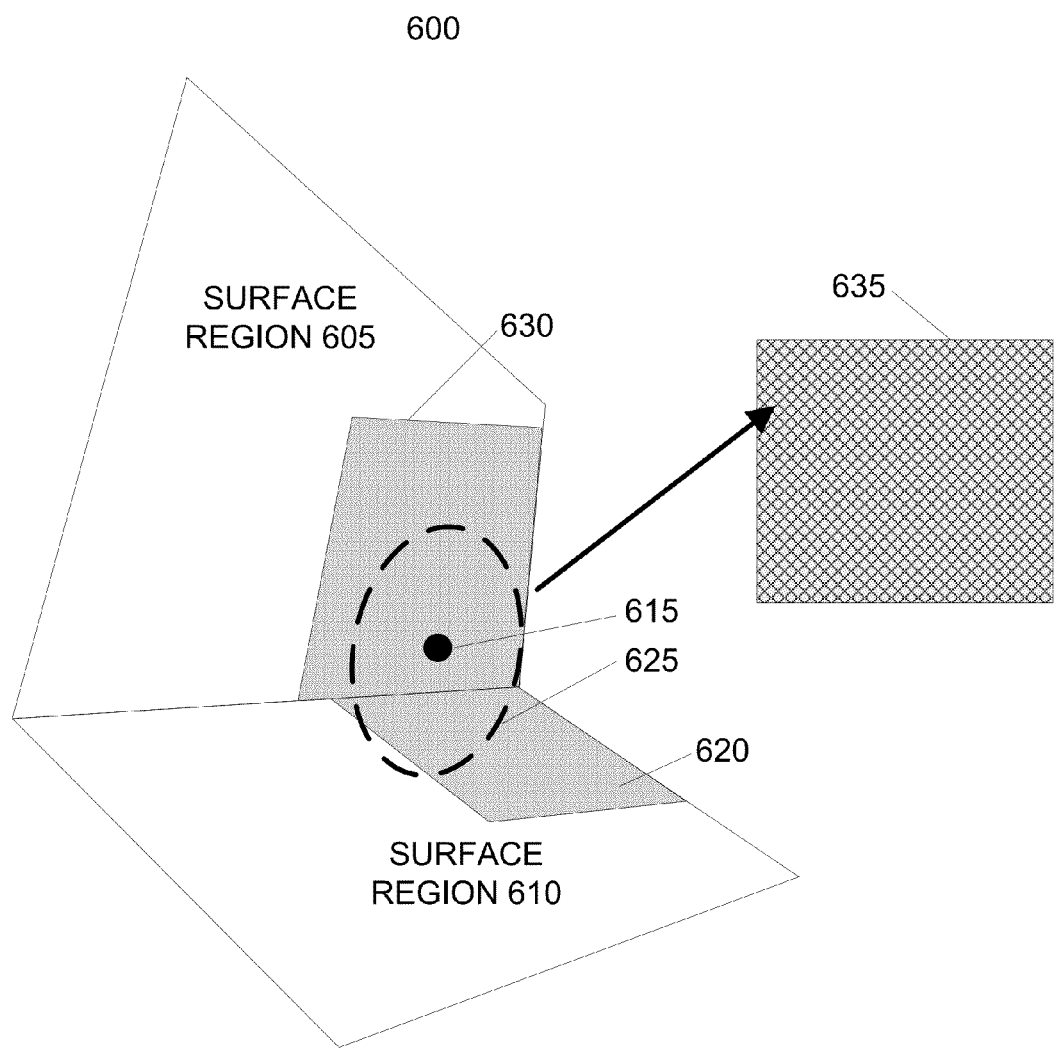
FIG. 6 illustrates an example of sampling surface attribute values for caching according to an embodiment of the invention.

FIG. 6 illustrates an example of sampling surface attribute values for caching according to an embodiment of the invention. During step 430 of method 400, the surface attribute value of a quadrilateral or other portion of a surface is determined by evaluating a surface attribute function at one or more surface regions. If the value of the surface attribute function varies over the quadrilateral, a filtering function may be used to determine single surface attribute value at a sample point for each surface region based on the combination of surface attribute values surrounding the sample point. In an embodiment, the influence of the filtering function may spill over into an adjacent surface region.

FIG. 6 illustrates an example surface 600. In this example, surface 600 has been divided into surface regions 605 and 610, based upon the selected resolution level used to sample the surface attribute function. To determine the surface attribute value for surface region 605, a sample point 615 is selected. A filtering function centered around sample point 615 evaluates surface attribute values within filter area 625 to determine a combined surface attribute value.

In this example, the filter area 625 extends past the boundary of surface region 605 to cover a portion of surface region 610. In an embodiment, the filtering function uses surface attribute values within the filter area 625 from both surface regions 605 and 610 to determine the combined surface attribute value for sample point 615. In this example, a first shaded portion 630 represents one or more surface attribute values associated with surface region 605. Similarly, a second shaded portion 620 represents one or more surface attribute values associated with surface region 610. The filtering function evaluates surface attribute values in the shaded regions 620 and 630 and enclosed by filter area 625 to determine a combined surface attribute value 635 for sample point 615. The combined surface attribute value 635 can be stored in a resolution level of a multiresolution cache.

Figure 7:
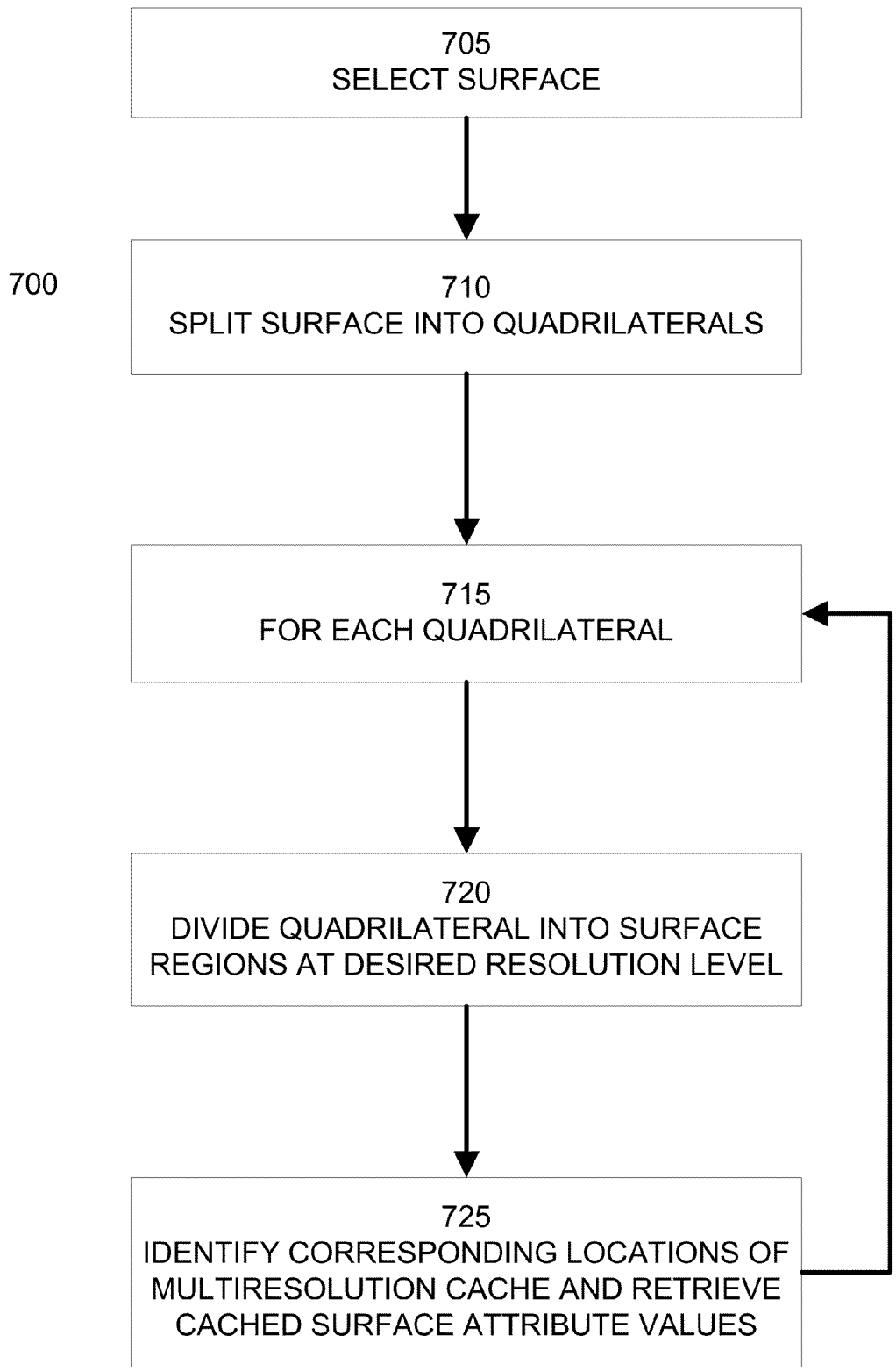
FIG. 7 illustrates a method of evaluating surface attribute values for a surface without a global surface coordinate system according to an embodiment of the invention.

FIG. 7 illustrates a method 700 of evaluating surface attribute values for a surface without a global surface coordinate system according to an embodiment of the invention. Step 705 selects a surface for evaluation. Step 710 splits the surface into one or more quadrilaterals. In an embodiment, step 710 may first divide the surface into a set of faces having arbitrary shapes. The set of faces is then further divided into quadrilaterals. In an embodiment, step 710 provides the quadrilateral with a unique identifier. This identifier corresponds to the identifier associated with the quadrilateral in method 400, so that the quadrilaterals created in step 710 correspond with the quadrilaterals previously created and evaluated in method 400. Step 715 selects one of the quadrilaterals for evaluation.

Step 720 divides the selected quadrilateral into surface regions. In an embodiment, step 720 is provided with a desired resolution level to use in dividing the quadrilateral into surface regions. In a further embodiment, an application such as a renderer provides the desired resolution level for the quadrilateral based on the quadrilateral's projected coverage of one or more pixels.

In an embodiment, step 720 divides the selected quadrilateral into surface regions using an ordering scheme similar to that used in method 400. The surface regions of a selected quadrilateral do not necessarily have to correspond with the surface regions previously created and evaluated in method 400, provided that the local coordinate system of the selected quadrilateral is consistent with the local coordinate system of the corresponding quadrilateral created and evaluated in method 400.

Step 725 identifies the storage locations of the multiresolution cache corresponding with the surface regions created in step 720. In an embodiment, step 725 first uses the identification associated with the quadrilateral to select the appropriate multiresolution cache.

Step 720 matches the desired resolution level with a resolution level of the multiresolution cache. In a further embodiment, if surface attribute values from two or more quadrilaterals are stored in the same resolution level of the multiresolution cache, step 725 utilizes the selected quadrilateral's identification to select an appropriate portion of the selected resolution level of the multiresolution cache that includes cached surface attribute values for the selected quadrilateral.

Step 725 then matches surface regions with cached surface attribute values. In an embodiment, cached surface attribute values are arranged according to the ordering scheme used to create surface regions in methods 400 and 700. Thus, an embodiment of step 725 can retrieve and assign cached surface attribute values to surface regions according to the ordering scheme. As the ordering scheme is consistent between method 400 and method 700, the surface attribute value for a given surface region stored in method 400 will be retrieved and assigned to the same surface region in method 700.

In an embodiment, if the selected resolution level of the multiresolution cache and the desired resolution level used to divide the selected quadrilateral into surface regions are exactly the same, then there will be a one to one correspondence between cached surface attribute values and surface regions. As a result, cached surface attribute values can be directly assigned to surface regions without interpolation.

In a further embodiment of method 400, cached surface attribute values for a quadrilateral are arranged within their respective resolution level according to their positions within the quadrilateral. In this embodiment, step 725 selects a resolution level of the multiresolution cache that is equal or greater than the desired resolution level, which may be based on the size of the quadrilateral when projected into the image plane, based on the size of a pixel or sub-pixel region in the image plane projected on to the surface, or any arbitrary desired sampling rate and filter size. If these resolution levels are not equal, then step 725 interpolates between adjacent cached surface attribute values to determine a surface attribute value for each region.

Following the assignment of surface attribute values to surface regions of the selected quadrilateral, method 700 proceeds to step 715 to select another unprocessed quadrilateral of the surface. Steps 715 to 725 can be repeated as often as necessary to retrieve cached surface attribute values for all of the surface regions of all of the quadrilaterals of the selected surface. The retrieved cached surface attribute values can be used in the same manner as surface attribute values determined directly from surface attribute functions.

As described above, surface attribute values associated with surfaces without global surface coordinates may be preprocessed and cached in a multiresolution cache to facilitate efficient and accurate rendering. Each surface attribute function associated with a surface or a surface region may be sampled, pre-filtered, and stored in the multiresolution cache using any type of sampling and filtering technique.

Figure 9:
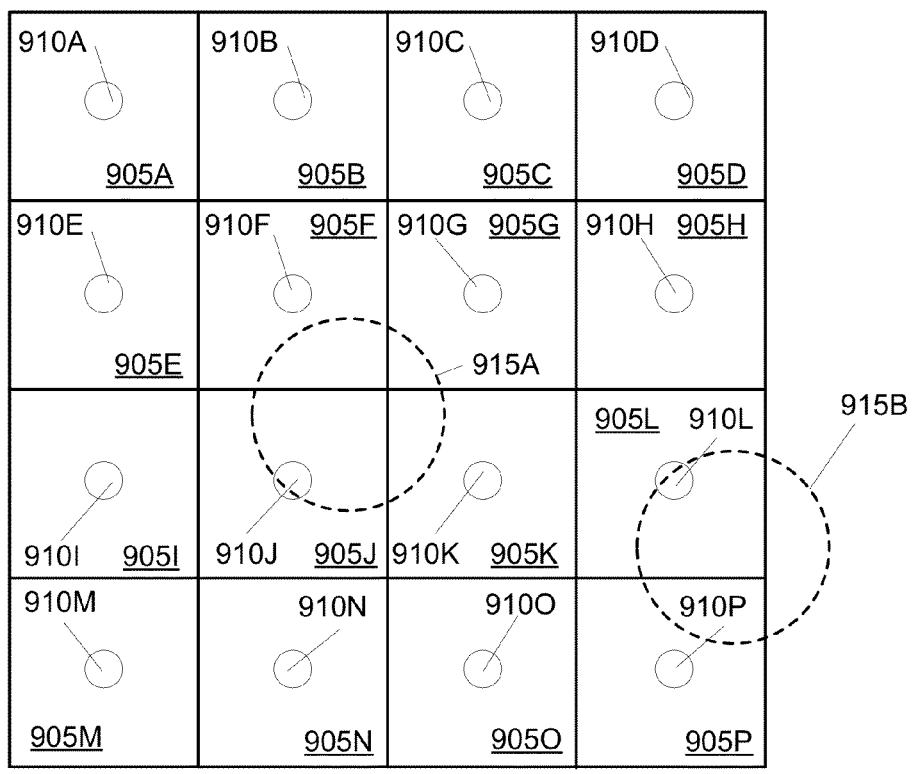
FIG. 9 illustrates a prior example distribution of sample values of a surface attribute function.

FIG. 9 illustrates a prior example distribution of sample values of a surface attribute function. FIG. 9 illustrates a portion 900 of a multiresolution cache associated with a quadrilateral, triangle, or other portion of a surface having a local surface coordinate system. As described above, the multiresolution cache may store portion 900 associated with the portion of a surface together with surface attribute function values associated with other portions of other surfaces.

In this example, portion 900 of the multiresolution cache samples the surface attribute function at a resolution of 4×4, for a total of sixteen samples of the surface attribute function. Portion 900 of the multiresolution cache is evenly divided into equal size regions, referred to as surface regions 905A-905P. Sample points 910A-910P are located in the center of their respective surface regions 905A-905P. In this example, each of the sample points 910 represents a value of the surface attribute function within its respective surface region 905. Each of the sample points' 910 values may be based on a point sampling of the surface attribute function or a filtering of two or more values of the surface attribute function within their respective sampling regions, such as an unweighted or weighted average of surface attribute function values within their respective sampling regions.

During rendering, a renderer may use a filtering function to determine a combined surface attribute function value for a surface region. In this example, the renderer determines a combined surface attribute function value over a filter area based on the filtering function. Filter areas 915 represent example projections of the filtering function into the local surface coordinate system associated with portion 900 of the multiresolution cache. For filter area 915A, the combined surface attribute function value is based on a weighted combination of the values of sample points 910F, 910G, 910J, and 910K.

Similarly, for filter area 915B, the combined surface attribute function value is based on a weighted combination of the values of sample points 910L and 910P and two additional sample points in an adjacent quadrilateral, triangle, surface region, or other portion of a surface. To determine the values of these two additional sample points, the renderer must access a different portion of the multiresolution cache. This other portion of the multiresolution cache may not be contiguous with portion 900.

Accessing non-contiguous portions of a multiresolution cache may incur performance penalties, especially when the renderer is implemented using one or more hardware graphics processing units (GPUs). To address this, a further embodiment of the invention uses an alternative arrangement of sample points relative to surface regions. As described in detail below, this alternative arrangement of sample points within their surface regions eliminates the need to access surface attribute function values associated with different quadrilaterals, triangles, or other portions of a surface during rendering, even when the filter area crosses a boundary with an adjacent quadrilateral, triangle, surface region, or other portion of a surface.

Figure 10A:
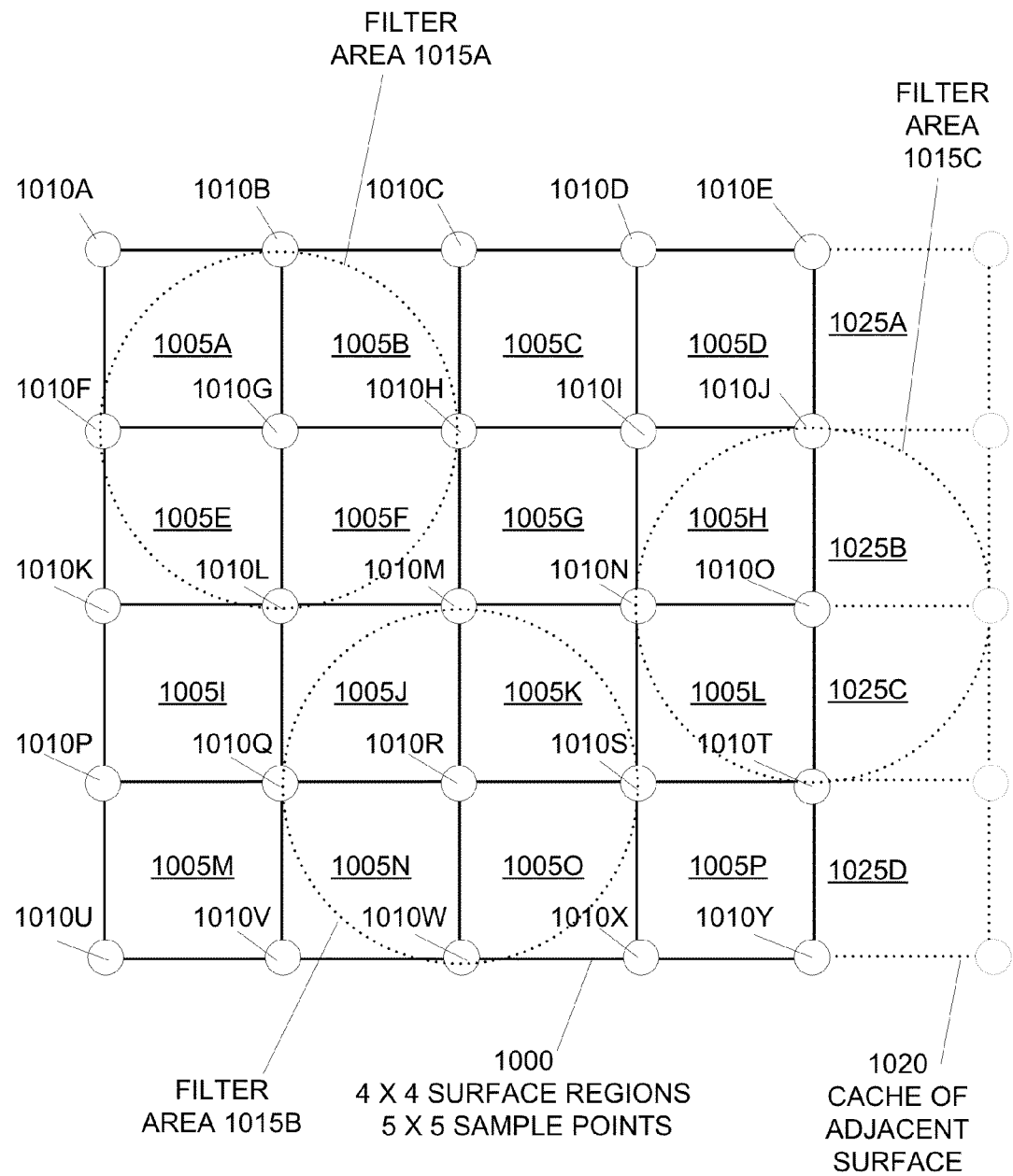
FIGS. 10A-10C illustrate an alternative example distribution of sample values of a surface attribute function according to an embodiment of the invention.

FIG. 10A illustrates a portion 1000 of a multiresolution cache associated with a quadrilateral, triangle, or other portion of a surface having a local surface coordinate system. As described above, the multiresolution cache may store portion 1000 associated with the portion of a surface together with surface attribute function values associated with other portions of other surfaces.

In this example, portion 1000 of the multiresolution cache is evenly divided into sixteen equal size regions, referred to as surface regions 1005A-1005P. However, unlike the previous example 900 of a multiresolution cache, sample points 1010 are located at the corners of each sample region, rather than in the centers of the sample region. Thus, in this example 1000, the 4×4 arrangement of surface regions results in a 5×5 arrangement of sample points 1010A-1010Y. In a further embodiment, sample points may coincide with vertices of the surface.

In an embodiment, each of the sample points 1010 represents a value of the surface attribute function in a filter area surrounding the sample point. The values of the sample points may be determined in a prefiltering step as part of the precalculating and caching step 305 discussed above. These filter areas include the four surface regions adjacent to each of the sample points 1010. For example, sample point 1010G is associated with filter area 1015A covering portions of surface regions 1005A, 1005B, 1005E and 1005F. Thus, the value of the sample point 1010G is based on the values of the surface attribute function within surface regions 1005A, 1005B, 1005E and 1005F. Similarly, the value of sample point 1010R is based on the values of the surface attribute function associated with filter area 1015B covering portions of surface regions 1005J, 1005K, 1005N, and 1005O.

For sample points at the edge of portion 1000 of the multiresolution cache, such as sample points 1010A, 1010B, 1010C, 1010D, 1010E, 1010F, 1010O, 1010P, 1010T, 1010U, 1010V, 1010W, 1010X, and 1010Y, the filter areas used to determine the values of these sample points extend to adjacent quadrilaterals, triangles, surface regions, or other portions of a surface. As a result, the value of the surface attribute function for these sample points is based on the surface attribute function associated with other portions of other surfaces in addition to the surface attribute function represented by portion 1000 of the multiresolution cache.

For example, sample point 1010O is associated with a filter area 1015C. Filter area 1015C covers portions of surface regions 1005H and 1005L in portion 1000 of multiresolution cache. Additionally, filter area 1015C extends to a geometrically adjacent portion of the surface. The geometrically adjacent portion of the surface may be associated with a different surface attribute function. In this example, filter area 1015C covers surface regions 1025B and 1025C in portion 1020 of the multiresolution cache.

In an embodiment, the prefiltering step resamples the surface attribute function with an additional number of sample points than originally defined by the surface attribute function. For example, a surface attribute function may originally defined by a content creator as a texture map having M by N sample regions and hence M by N sample points, where M and N are arbitrary positive integers. As shown in FIG. 9, these sample points are located in the centers of their respective sample regions. In an embodiment, the prefiltering step resamples the M by N sample regions with M+1 by N+1 sample points, located at the corners of each sample region, as shown in FIG. 10A. As described in detail below, the resampling of the surface attribute function values at surface region corners and associated prefiltering eliminates the need for renderers to access surface attribute function values across boundaries of the surface.

Figure 10B:
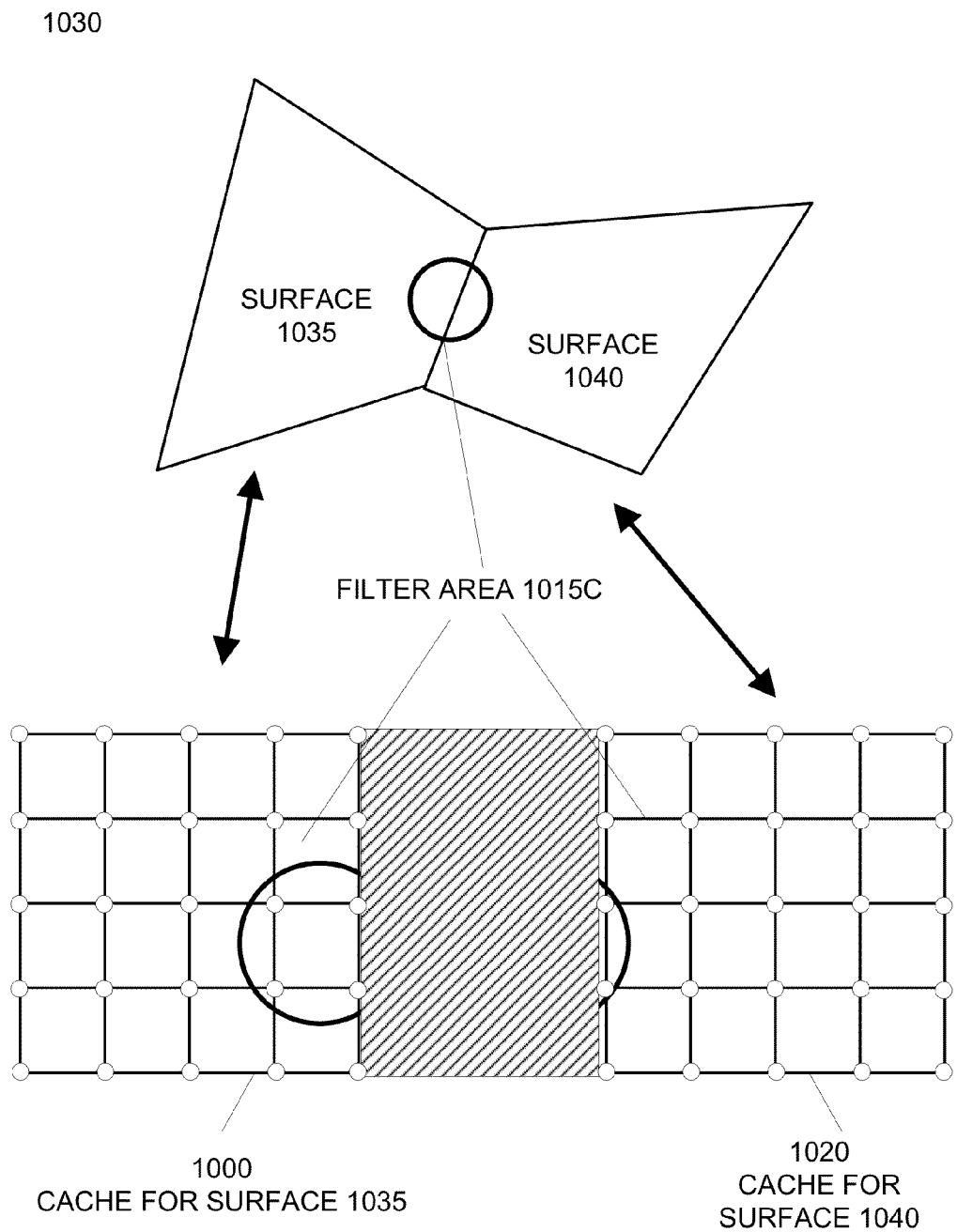

Although filter area 1015C covers geometrically adjacent portions of a surface, the corresponding portions 1000 and 1020 of the multiresolution cache may or may not be adjacent. FIG. 10B illustrates an example relationship 1030 between surfaces and corresponding portions of the multiresolution cache. In example 1030, a surface includes two geometrically adjacent primitives, such as quadrilaterals 1035 and 1040. In this example 1030, the sampled surface attribute function values of quadrilateral 1035 are stored in part in portion 1000 of the multiresolution cache and the sampled surface attribute function values of quadrilateral 1040 are stored in part in portion 1020 of the multiresolution cache.

In the example 1030, portions 1000 and 1020 of the multiresolution cache are not contiguous in memory, even though the corresponding primitives are geometrically adjacent. Thus, a filter area 1015C covering portions of both of these primitives references surfaces attribute values that are separated in memory, as shown in FIG. 10B.

Embodiments of the invention may use any type of filtering to determine prefiltered values of sample points. In an embodiment, the value of a sample point may be determined by a filter based in part on the geodesic distance between adjacent sample points, rather than their distance in the local surface coordinate system. For example, a value of the sample point may be defined using a bilateral filter using the following equations:

$$P(v) = \frac{1}{\int k(D)(v, v'))G\left(\frac{N_v \cdot N_{v'}}{\|N_v\|\|N_{v'}\|}\right) dA} \int k(D(v, v'))G\left(\frac{N_v \cdot N_{v'}}{\|N_v\|\|N_{v'}\|}\right) S(v') dA$$

$$P(v) \approx \sum_{D(v,v') \leq K_W} k(D(v, v'))G\left(\frac{N_v \cdot N_{v'}}{\|N_v\|\|N_{v'}\|}\right) S(v') A_{v'},$$

where v is the current sample point; P(v) is the prefiltered value of sample point v; D(v,v') is the geodesic distance between sample point v and another sample point v' within the filter area; S(v') is the original, unfiltered value of the surface attribute function at sample point v'; $A_{v'}$ is the area weight of the sample point v'; and $N_V$ and $N_{V'}$ are the surface normal vectors at sample points v and v'. K is filter kernel based in this example on distance, G is a filter kernel based on surface normal vectors, and $K_W$ is the size of the filter area. Alternate embodiments of the invention may omit the second filter kernel G if the filtering is not based at least in part on surface normal vectors.

Although determining the values of sample points at the edges of a portion of the multiresolution cache may require accessing non-contiguous portions of surface attribute functions, in this embodiment, this access is performed in a pre-processing and prefiltering step to generate the multiresolution cache prior to rendering. During rendering, the use of prefiltered sample points located at the edges of surface regions eliminates the need to access non-contiguous portions of the multiresolution cache when the filter area cross surface boundaries.

Figure 10C:
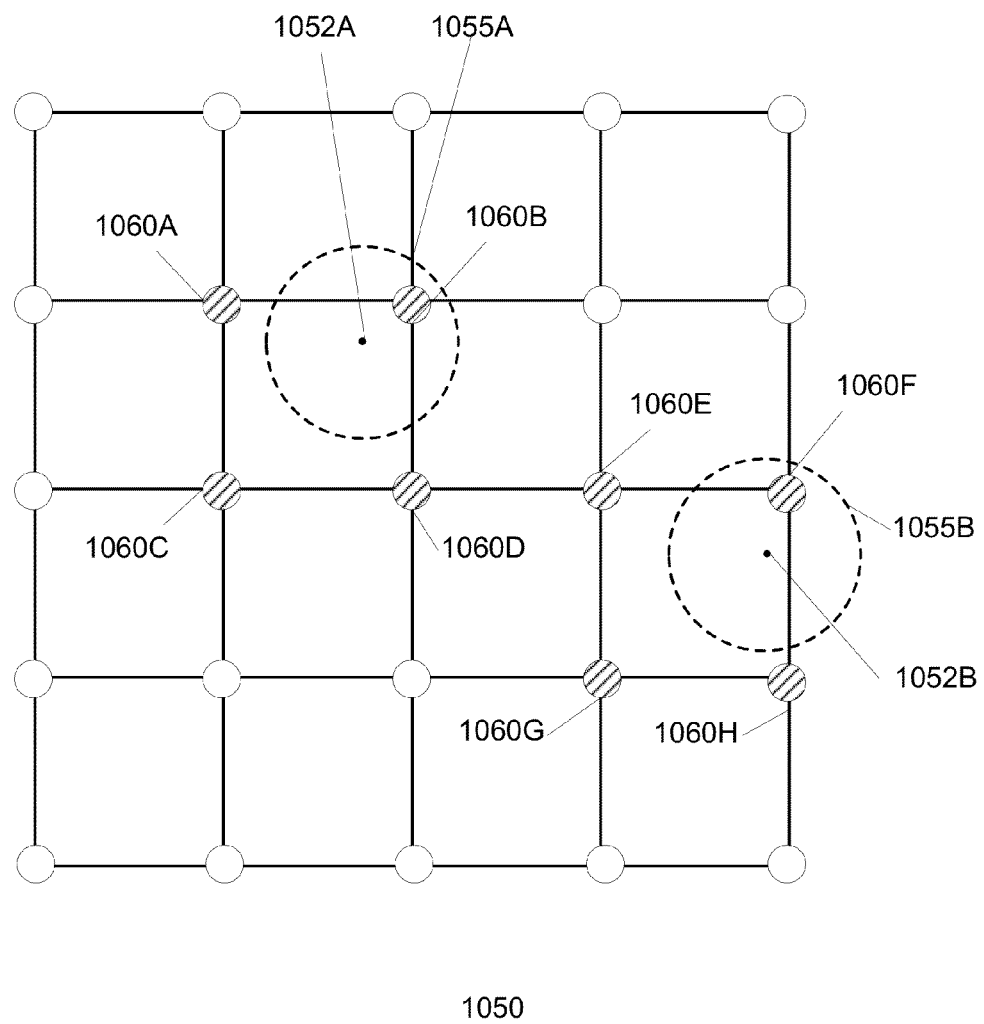

FIG. 10C illustrates an example filtering operation during rendering according to an embodiment of the invention. In this example, a portion 1050 of a multiresolution cache includes sample points 1060 located at the corners of sample regions, as described in FIGS. 10A and 10B. Additionally, the values of the sample points 1060 are based on a filtering of surface attribute function values in the surface regions surrounding the sample points 1060.

During rendering, a renderer samples the surface attribute function using a renderer filter kernel. FIG. 10C illustrates renderer filter kernel 1055A projected into a portion 1050 of the multiresolution cache at point 1052A. In an embodiment, the prefiltered values of the sample points 1060 are used to evaluate the renderer filter kernel 1055A. In this example, the sampled value of the surface attribute function at location 1052A using renderer filter kernel 1055A can be determined by a weighted combination of the values of sample points 1060A, 1060B, 1060C, and 1060D. For example, the sampled value of the surface attribute function at location 1052A may be determined from bilinear interpolation of sample points 1060A-1060D. As described below, sample points from multiple portions of the multiresolution cache at different resolution levels may be combined using trilinear filtering as well.

Similarly, the sampled value of the surface attribute function at location 1052B using renderer filter kernel 1055B can be determined by a weighted combination of the values of sample points 1060E, 1060F, 1060G, and 1060H. Although the renderer filter kernel 1055B extends outside the portion 1050 of the multiresolution cache, the renderer does not need to access any sample points outside of this portion of the multiresolution cache to evaluate the renderer filter kernel 1055B. This is because the values of sample points 1060F and 1060H have been prefiltered to include surface attribute function values on adjacent surfaces. Because a renderer does not need to access non-contiguous portions of a multiresolution cache when a renderer filter kernel crosses a surface boundary, rendering software applications and hardware graphics processing units can render surface attributes from the multiresolution cache efficiently.

As described above, the multiresolution cache may include surface attribute function values for a surface at multiple resolution levels. The use of multiple resolution levels allows memory to be used efficiently by only loading resolution levels as needed depending on the amount of detail required. Additionally, if each resolution level is created using a filter kernel with appropriate low-pass characteristics, then aliasing artifacts can be reduced.

In prior techniques, such as mipmapping, a texture is stored at its highest resolution level, referred to as level 1, down to a lowest resolution level of a single texel, referred to as level N. In mipmapping, the lowest resolution level of texture data has a single texel with a value representing a low pass filtering (such as an average) of the surface attribute function values over the surface.

In contrast, an embodiment of the multiresolution cache stores surface attribute function values at a highest value, referred to as level 1, to a low resolution level of two by two sample points, referred to as level N, and further to one or more additional low resolution levels, levels N+1, N+2, etc. Each of these low resolution levels at level N or greater includes two by two sample points. However, the values of the sample points at each of the low resolution levels are based on a filter kernel of increasing size and decreasing spatial frequency. By storing multiple low resolution levels in the multiresolution cache, renderers can determine sampled values of the surface attribute function at large levels of minification without accessing adjacent surfaces or non-contiguous portions of the multiresolution cache. This allows renderers to sample the surface attribute function of small and/or distant surfaces without aliasing and without relying on oversampling.

Figure 11A:
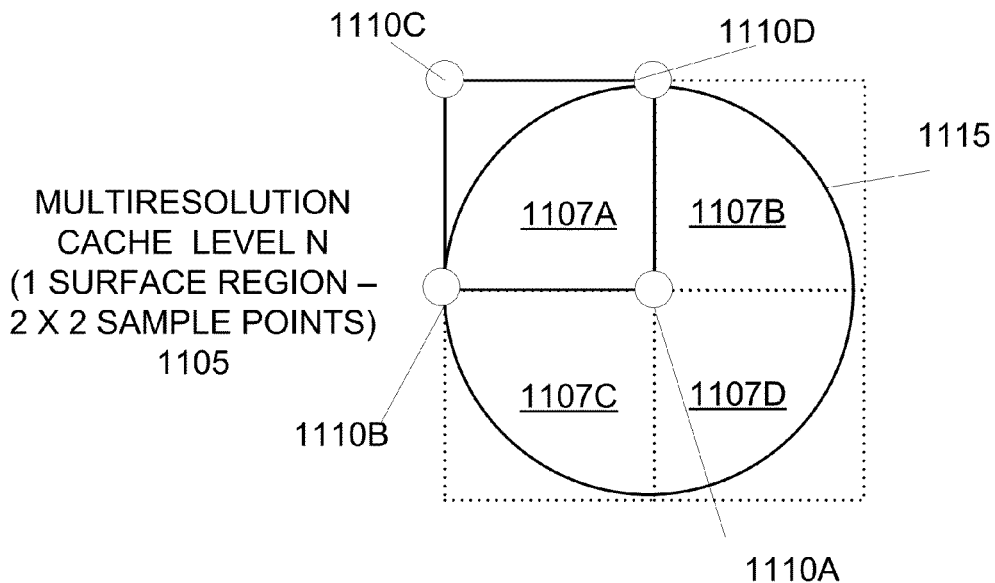
FIG. 11A-11B illustrates multiple levels of minification of sample values of a surface attribute function according to an embodiment of the invention.
Figure 11B:
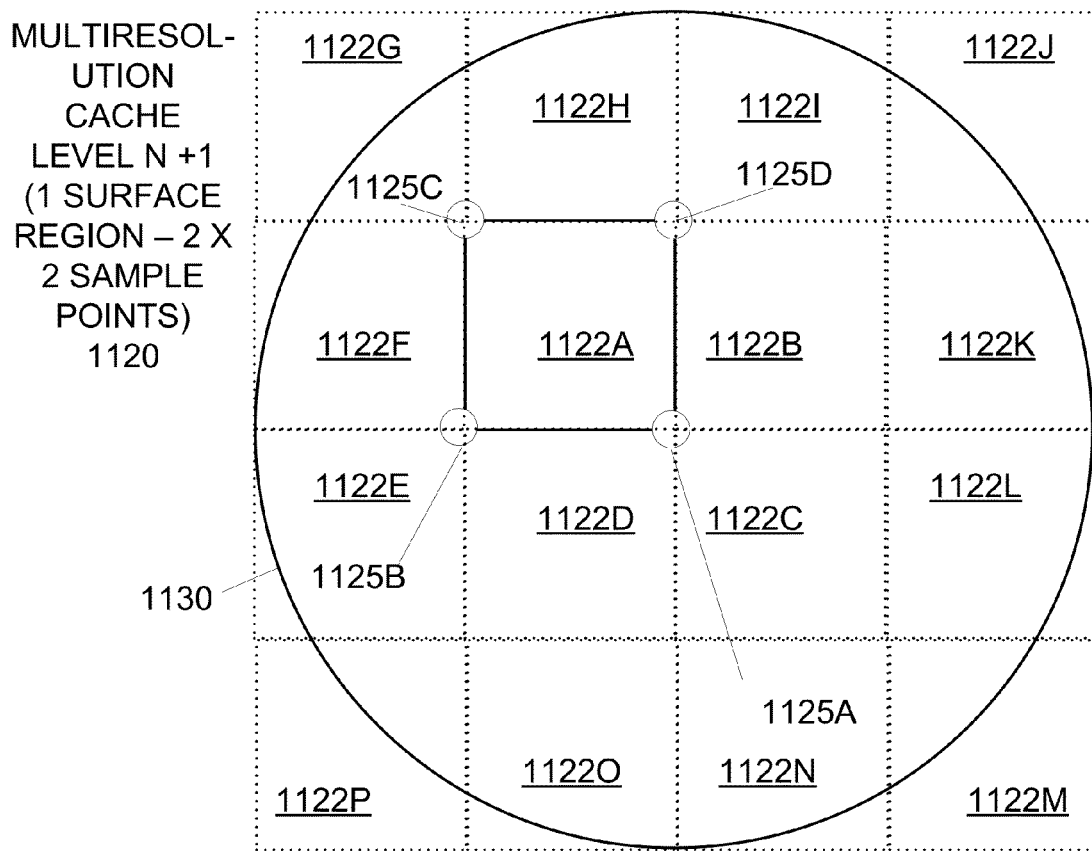

FIGS. 11A-11B illustrates multiple levels of minification of sample values of a surface attribute function according to an embodiment of the invention. In FIG. 11A, an example multiresolution cache includes a first low resolution level N 1105. Low resolution level N 1105 includes a single surface region 1107A and four sample points 1110A, 1110B, 1110C, and 1110D. Each of the sample points 1110 has a value based on a prefiltering of the surface attribute function values within a filter kernel extending outside the associated surface to adjacent surfaces. For example, sample point 1110A has a value based on the surface attribute function values within filter kernel 1115, which includes portions of surface region 1107A, and adjacent surfaces corresponding with surface regions 1107B, 1107C, and 1107D. It should be noted that although the surfaces corresponding with surface regions 1107A-1107D are adjacent, these surface regions may not be adjacent in the multiresolution cache. The arrangement of surface regions 1107A-1107D adjacent to each other as shown in FIG. 11A is not required.

FIG. 11B illustrates a second example low resolution level N+1 1120. Resolution level N+1 1120 is adapted to cache the same surface attribute function as low resolution level N 1105, but at a lower spatial frequency. In this example, resolution level N+1 1120 includes a single surface region 1122A and four sample points 1125A, 1125B, 1125C, and 1125D, similar to the low resolution level N 1105. However, the filter kernel used to determine the prefiltered values of the sample points 1125 in low resolution level N+1 1120 is much larger and has a lower spatial frequency cutoff than the filter kernel used for low resolution level N 1105. For example, sample point 1125A has a value based on the surface attribute function values within filter kernel 1130, which includes portions of surface region 1122A, and adjacent surfaces corresponding with surface regions 1122B-1122P. It should be noted that although the surfaces corresponding with surface regions 1122A-1122P are adjacent, these surface regions may not be adjacent in the multiresolution cache. The arrangement of surface regions 1122A-1122P adjacent to each other as shown in FIG. 11B is not required.

During rendering, a renderer may select the appropriate resolution level of the multiresolution cache based on the size and optionally shape of the renderer filter kernel as projected on to the surface. Regardless of which resolution level is selected by the renderer, the renderer only needs to access the four sample points surrounding the center point of the renderer filter kernel to determine the sampled value of the surface attribute function.

For example, if resolution level N 1105 is selected by the renderer, the renderer can evaluate a renderer filter kernel centered anywhere within surface region 1107A as a weighted combination of sample points 1110A-1110D, even if the renderer filter kernel partially overlaps any adjacent surfaces and surface regions. Similarly, if resolution level N+1 1120 is selected by the renderer, the renderer can evaluate a renderer filter kernel centered anywhere within surface region 1122A as a weighted combination of sample points 1125A-1125D, even if the renderer filter kernel partially overlaps any adjacent or nearby surfaces and surface regions including surface regions 1122B-1122Y.

In an embodiment, any arbitrary number of low resolution levels may be generated and stored in a multiresolution cache using two by two sample points each. These low resolution levels are prefiltered with progressively larger filter kernel. For example, low resolution level N+1 1120 may be based on a filter kernel twice the size of low resolution level N 1105. In this example, the prefiltered value of a sample point in any arbitrary resolution level may be expressed as:

$$P_m(v) = \sum_{D(v,v') \leq (K')_w} k'(D(v, v')/2^m) P_{m-1}(v') G(N_v \cdot N_{v'}),$$

where m is the current resolution level; $P_m$ is the prefiltered value of the sample point at resolution level m; $P_{m-1}$ is the prefiltered value of a sample point at the next higher resolution level m−1; v is the current sample point; D(v,v') is the geodesic distance between sample point v and another sample point v' within the filter area; $N_V$ and $N_{V'}$ are the surface normal vectors at sample points v and v'; k' and G are filter weights and $K_W$ is the size of the filter area.

During rendering, a renderer application or graphics processing unit hardware selects one or more of the resolution levels in the multiresolution cache for sampling with the renderer filter kernel to determine the value of the surface attribute function at a location on the surface. In an embodiment, the selection of a resolution level is based on the derivative of the object space position with respect to a screen space coordinate system. For example, a renderer may determine the Jacobian of the surface at a desired sample location in object space and select the resolution level, m, as:

$$m = \log_2\left(\max\left(\left\|\left\langle\frac{\partial O_x}{\partial x}, \frac{\partial O_y}{\partial x}, \frac{\partial O_z}{\partial x}\right\rangle\right\|, \left\|\left\langle\frac{\partial O_x}{\partial y}, \frac{\partial O_y}{\partial y}, \frac{\partial O_z}{\partial z}\right\rangle\right\|\right)\right),$$

where O is an object space coordinate. Using object space coordinates provides C0 continuity across boundaries of adjacent surfaces with different levels of resolution. In contrast, typical mipmapping techniques select a mipmap level using the derivative of the texture space with respect to the screen space coordinate system, such as:

$$m = \log_2\left(\max\left(\left\|\left\langle\frac{\partial u}{\partial x}, \frac{\partial v}{\partial x}\right\rangle\right\|, \left\|\left\langle\frac{\partial u}{\partial y}, \frac{\partial v}{\partial y}\right\rangle\right\|\right)\right),$$

where u and v are the texture space coordinates.

Embodiments of the invention may sample values of the surface attribute function using one or more resolution levels of the multiresolution cache using any combination of software, fixed function graphics processing unit hardware, and/or shader or stream programs adapted to be executed by one or more programmable stream processing units within a graphics processing unit or microprocessor. For example, a shader program may be used to select resolution levels of the multiresolution cache during rendering and fixed function graphics processing unit hardware may be used to perform all or a portion of the evaluation of the renderer filter kernel using sample point values of the multiresolution cache.

The renderer filter kernel may be isotropic or anisotropic. For anisotropic filtering, an embodiment of the invention selects one or more resolution levels based on the size of the minor axis of an ellipse representing the projection of the renderer filter kernel on to the surface. The renderer can then sample the selected resolution levels of the multiresolution cache using any anisotropic filtering technique known in the art. In a further embodiment, the dimensions of the axis of the ellipse are modified to account for the use of geodesic distance in object space coordinates, rather than texture space coordinates, in the multiresolution cache. For example, if the anisotropic filter specifies the ellipse of the projected renderer filter kernel in terms of the derivatives in texture space, then an embodiment of the invention modifies these values as follows:

$$\partial u' = \partial u \frac{l_u}{K_w}, \partial v' = \partial v \frac{l_v}{K_w},$$

where $l_u$ and $l_v$ are the geodesic lengths of the surface region in the u and v direction. In yet a further embodiment, the values of $l_u$ and $l_v$ may be precalculated for each sample point and stored in the multiresolution cache in conjunction with the prefiltered sample point values.

Additionally, the portions of the multiresolution cache may be padded with surface attribute function values of adjacent surfaces to assist in anisotropic filtering. To minimize the overhead associated with the padding, an embodiment of the invention attempts to cluster cached surface attribute function values for adjacent surfaces into adjacent portions of the multiresolution cache. Where clustering is not possible, due to adjacent surfaces having different resolutions or to memory or geometry constraints, the boundaries of each set of clustered cached surface attribute function values are padded. For extraordinary sample points, such as those that coincide with extraordinary vertices, an embodiment of the invention reverts to isotropic filtering.

Another advantage of the alternative arrangement of sample points at the corners of surface regions, rather than in the center of sample regions, is that the sample point locations are a nested function space at different levels of resolutions. This means that the sample point locations at any given level of resolution (N) are a subset of the sample point locations at any higher level of resolution (M, where M<N). This guarantees that surface attribute function values are at least C0 continuous across boundaries between surfaces at different levels of resolution.

Figure 12A:
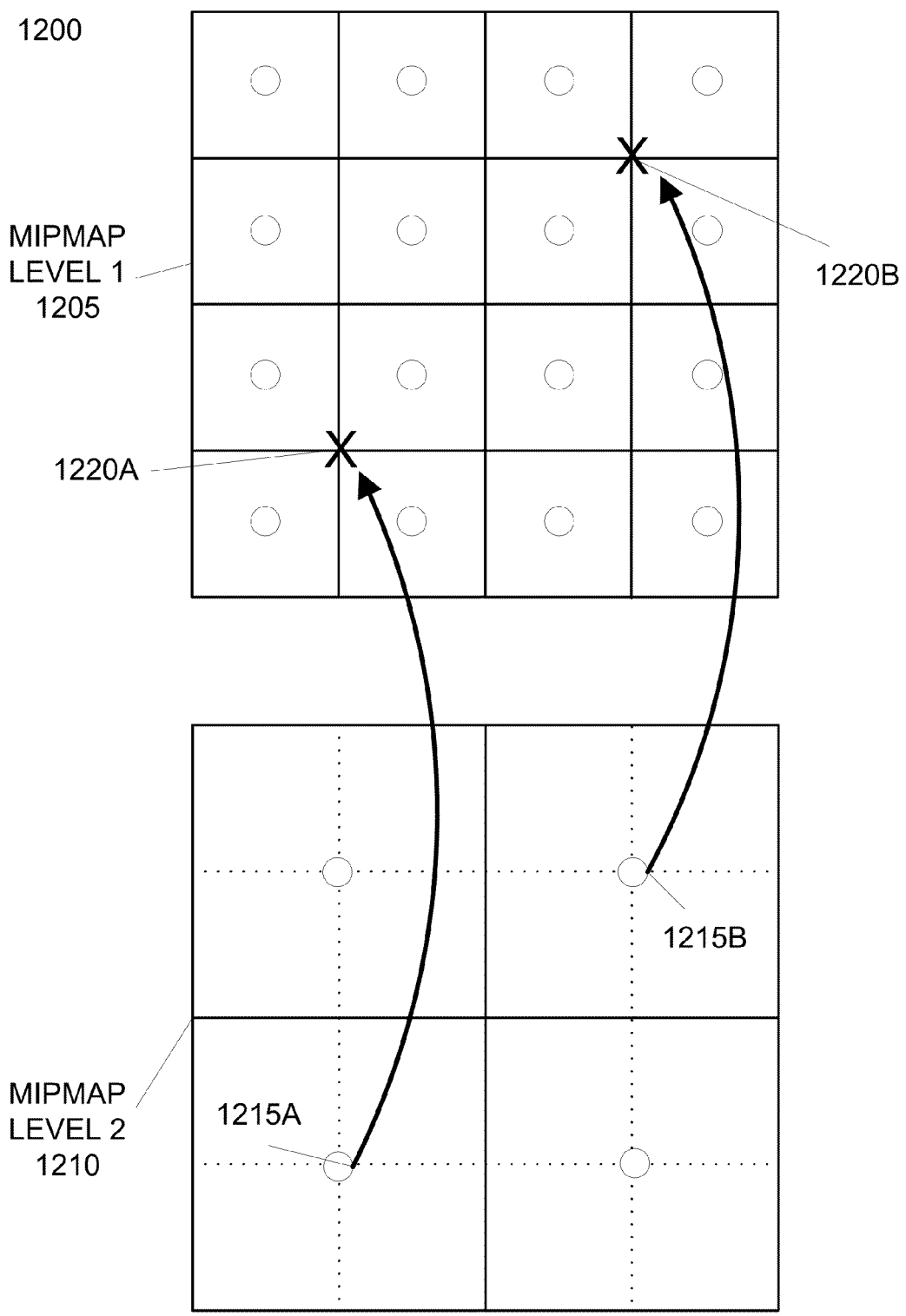
FIGS. 12A-12C illustrate a nested function space characteristics of multiple resolution levels of sample values of a surface attribute function according to an embodiment of the invention.
Figure 12B:
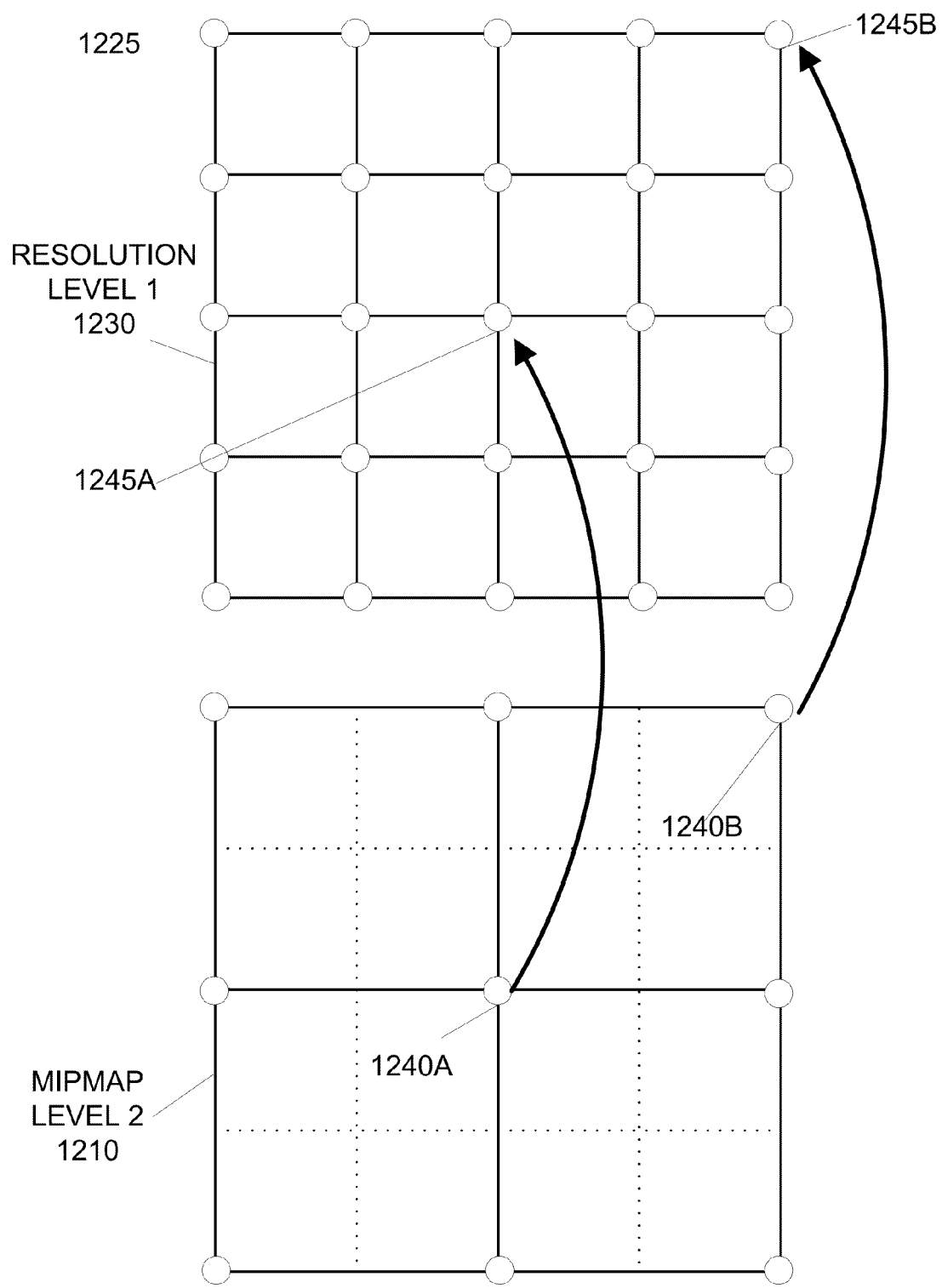
Figure 12C:
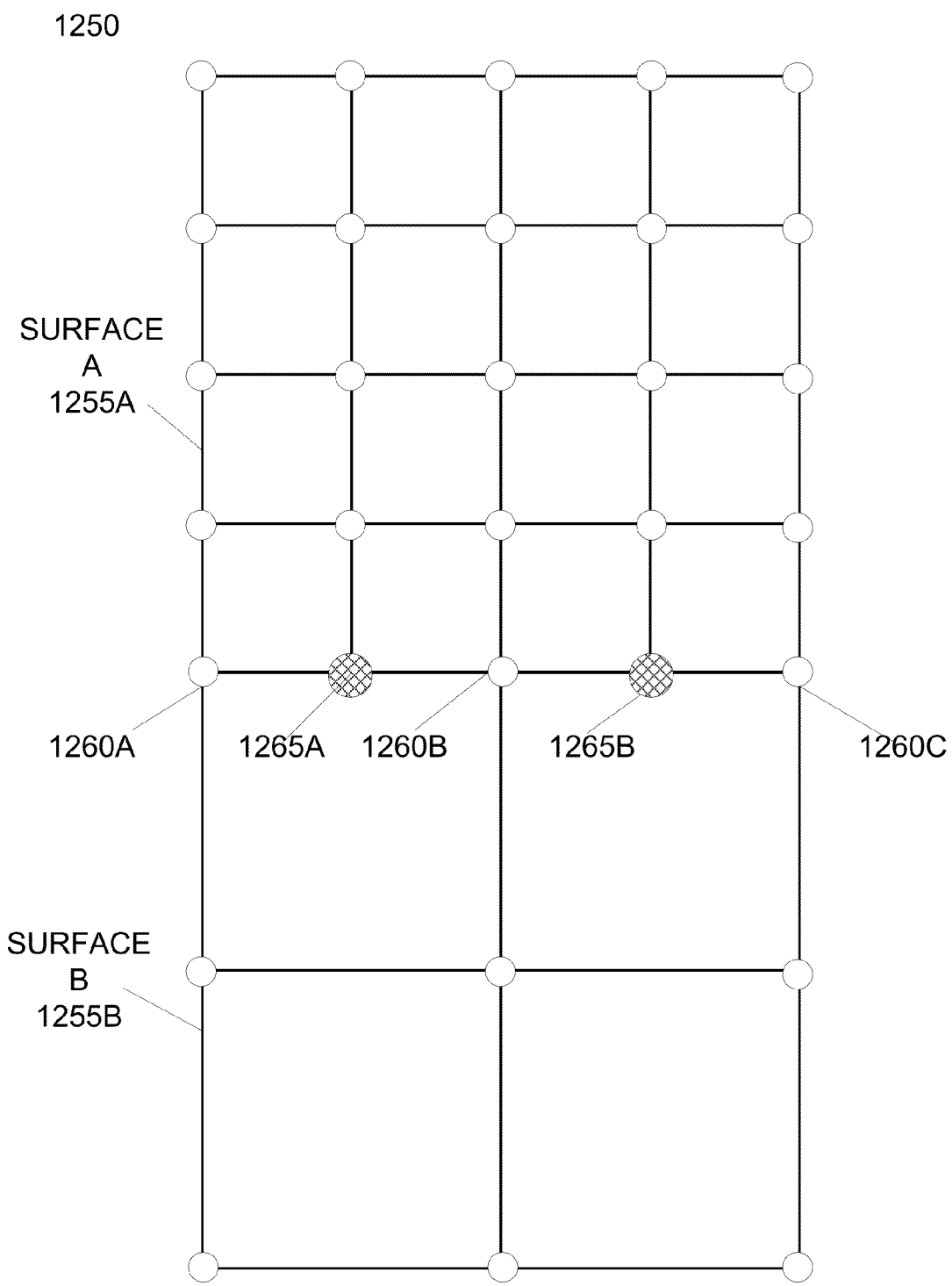

FIGS. 12A-12C illustrate a nested function space characteristics of multiple resolution levels of sample values of a surface attribute function according to an embodiment of the invention. FIG. 12A illustrates a typical prior arrangement 1200 of sample points in a texture map or other type of cache. In this example 1200, a texture map includes a first mipmap level 1 1205 at a high level of resolution, such as four by four, and a second mipmap level 2 1210 at a lower level of resolution, such as two by two. In mipmap level 2 1210, the boundaries of the surface regions from the higher level of resolution mipmap 1205 are shown as dotted lines for the purpose of illustration.

In each of these mipmaps, sample points are located at the centers of their respective surface regions. Because of this, the locations of sample points in mipmap level 2 1210 do not match any of the sample point locations in the higher level of resolution mipmap 1205. For example, sample point 1215A in mipmap level 2 1210 has a location that corresponds with location 1220A in mipmap level 1 1205. However, as can be seen in this example, mipmap level 1 1205 does not include a sample point at location 1220A. Similarly, sample point 1215B in mipmap level 2 1210 has a location that corresponds with location 1220B in mipmap level 1 1205, but mipmap level 1 1205 does not include a sample point at location 1220B.

FIG. 12B illustrates an arrangement 1225 of sample points in portions of a multiresolution cache according to an embodiment. In this example 1225, a texture map includes a first resolution level 1 1230 at a high level of resolution, such as four by four surface regions. The first resolution level 1 1230 has sample points at the corners of the surface regions and thus has five by five sample points associated with the four by four surface regions. Similarly, a second resolution level 2 1235 has a lower level of resolution of two by two surface regions with three by three sample points at their corners. In resolution level 2 1235, the boundaries of the surface regions from the higher level of resolution mipmap 1230 are shown as dotted lines for the purpose of illustration.

Because the sample point locations form a nested function space, all of the sample point locations in a lower resolution level are also sample point locations in all higher resolution levels. For example, sample point 1240A in resolution level 2

1235 has a location that corresponds with location 1245A in resolution level 1 1230. As can be seen in this example 1225, resolution level 1 1230 includes a sample point at location 1245A. Similarly, sample point 1240B in resolution level 2 1235 has a location that corresponds with location 1245B in mipmap level 1 1230, which also includes a sample point. This correspondence of sample point locations between resolution levels holds for any sample point location in any lower resolution level with respect to any higher resolution level.

Because sample point locations in any lower resolution level always have corresponding sample point locations in any higher resolution level, this embodiment of the invention guarantees C0 continuity of surface attribute function values between adjacent surfaces with different levels of resolution. FIG. 12C illustrates an example 1250 of this continuity. In example 1250, two adjacent surfaces 1255A and 1255B have different resolution levels. Surface 1255A has four by four sample regions and five by five sample points, and surface 1255b has two by two sample regions and three by three sample points.

On the boundary between surfaces 1255A and 1255B, sample point locations 1260A, 1260B, and 1260C correspond with sample points in both surfaces 1255A and 1255B. However, sample point locations 1265A and 1265B are only found in the higher resolution level associated with surface 1255A. To maintain continuity of surface attribute function values across the boundary between surfaces 1255A and 1255B, an embodiment of the invention interpolates values for locations 1265A and 1265B based on the values of adjacent sample points at locations 1260A, 1260B, and 1260C.

Figure 8:
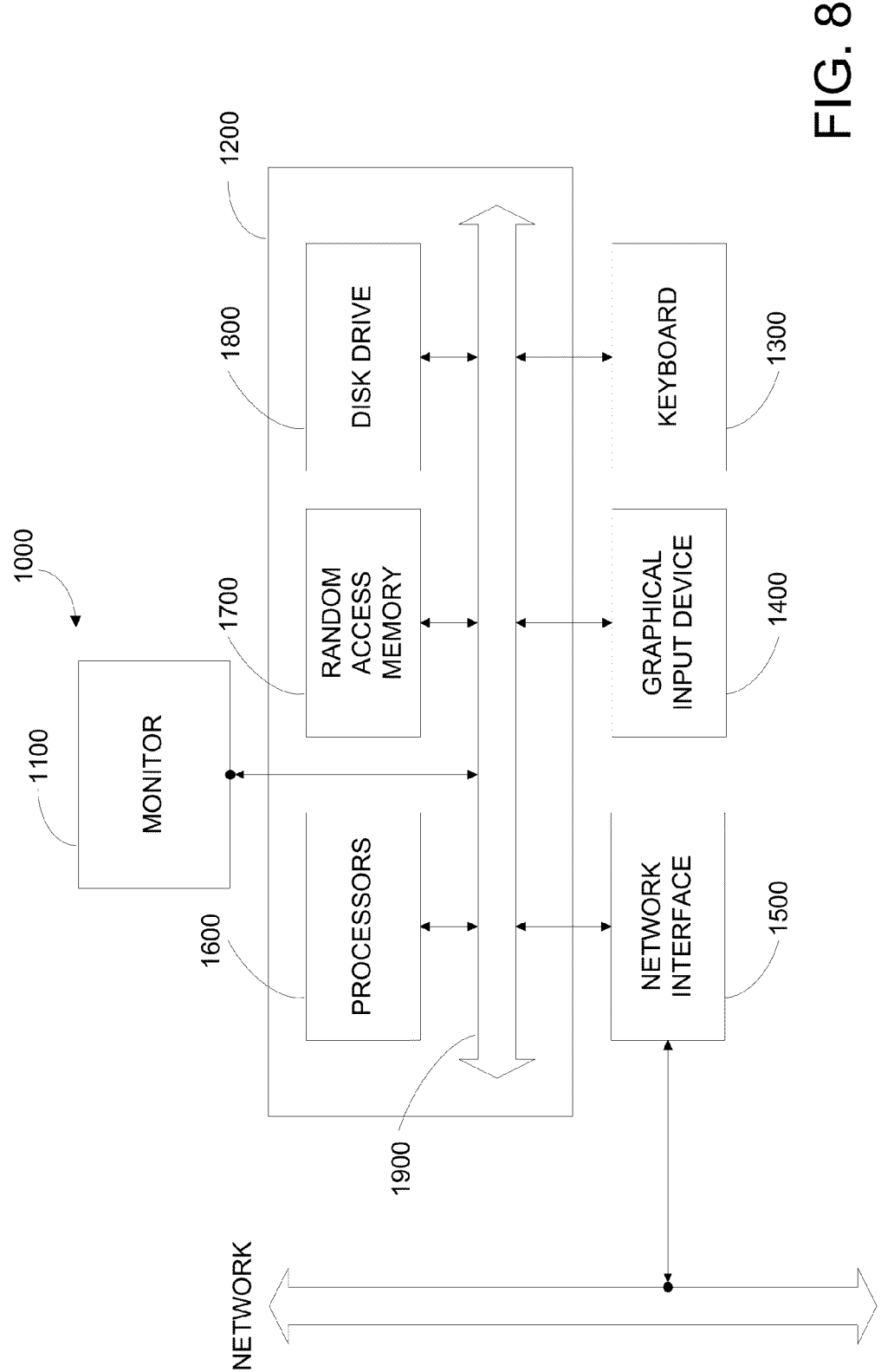
FIG. 8 illustrates an example computer system suitable for implementing an embodiment of the invention.

FIG. 8 illustrates an example computer system 1000 suitable for implementing an embodiment of the invention. Computer system 1000 typically includes a monitor 1100, computer 1200, a keyboard 1300, a user input device 1400, and a network interface 1500. User input device 1400 includes a computer mouse, a trackball, a track pad, graphics tablet, touch screen, and/or other wired or wireless input devices that allow a user to create or select graphics, objects, icons, and/or text appearing on the monitor 1100. Embodiments of network interface 1500 typically provides wired or wireless communication with an electronic communications network, such as a local area network, a wide area network, for example the Internet, and/or virtual networks, for example a virtual private network (VPN).

Computer 1200 typically includes components such as one or more processors 1600, and memory storage devices, such as a random access memory (RAM) 1700, disk drives 1800, and system bus 1900 interconnecting the above components. Processors 1600 can include one or more general purpose processors and optional special purpose processors for processing graphics and video data, audio data, or other types of data. General purpose and/or special purpose processors may each be comprised of one or more processing cores. Additionally, special purpose processors, such as graphics processing units, may be connected with dedicated memory for storing display information, such as a frame buffer, and instructions and data used to render images. Special purpose processors such as graphics processing units may include one or more programmable execution units capable of executing programs.

RAM 1700 and disk drive 1800 are examples of tangible media for storage of data, audio/video files, computer programs, applet interpreters or compilers, virtual machines, and embodiments of the herein described invention. Other types of tangible media include floppy disks; removable hard disks; optical storage media such as DVD-ROM, CD-ROM, and bar codes; non-volatile memory devices such as flash memories; read-only-memories (ROMS); battery-backed volatile memories; and networked storage devices.

Further embodiments can be envisioned to one of ordinary skill in the art after reading the attached documents. In other embodiments, combinations or sub-combinations of the above disclosed invention can be advantageously made. The block diagrams of the architecture and flow charts are grouped for ease of understanding. However it should be understood that combinations of blocks, additions of new blocks, re-arrangement of blocks, and the like are contemplated in alternative embodiments of the present invention.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A method of caching a value of a function associated with a surface, the method comprising:
   receiving a first surface associated with a surface attribute function;
   dividing the first surface into first surface regions, the first surface regions each having a plurality of corners;
   defining first sample point locations at the corners of the first surface regions;
   sampling the surface attribute function at each of the first sample point locations using first filter kernels to determine first sample point values, wherein the sampling comprises:
      determining if at least one of the sample point locations is adjacent to at least a second surface; and
      in response to the determination that the one of the sample point locations is adjacent to the second surface, sampling a second surface attribute function associated with the second surface using a portion of the first filter kernel associated with the one of the sample point locations, wherein the portion of the first filter kernel extends outside the first surface; and
   storing the first sample point values in a first portion of a cache.

2. The method of claim 1, wherein the first filter kernels include weightings of the surface attribute function based on geodesic distances on the first surface from each of their respective sample point locations.

3. The method of claim 1, further comprising:
   dividing the first surface into second surface regions;
   defining second sample point locations at the corners of the second surface regions;
   sampling the surface attribute function at each of the second sample point locations using second filter kernels to determine second sample point values; and
   storing the second sample point values in a second portion of the cache.

4. The method of claim 3, wherein the number of second surface regions is smaller than the number of first surface regions, and the second sample point locations correspond with a subset of the first sample point locations.

5. The method of claim 3, wherein the number of second surface regions is equal to the number of first surface regions, and the second filter kernels have filter areas larger than filter areas of the first filter kernels.

6. The method of claim 1, wherein the surface attribute function includes discrete sample point values corresponding with original sample point locations at the centers of the first surface regions.

7. The method of claim 1, wherein the surface attribute function includes an arrangement of M by N discrete sample point values, wherein M and N are positive integers, and defining the first sample point locations at the corners of the first surface regions comprises defining a M+1 by N+1 arrangement of the first sample point locations.

8. The method of claim 1, wherein the cache is a multiresolution cache, wherein the first sample point values are stored in the first portion of the multiresolution cache in association with a first local surface coordinate system defined by the first surface, wherein the first local surface coordinate system is independent of at least a second local surface coordinate system used to store additional sample point values in a second portion of the multiresolution cache.

9. The method of claim 1, wherein the first surface is selected from a group consisting of: a polygon mesh surface; a subdivision hierarchy of meshes converging at its limit to a subdivision surface; an implicit surface defined by an isosurface of a second function; a point set surface defined by a set of points; and a fractal surface.

10. The method of claim 1, wherein the surface attribute function includes surface attribute values selected from a group consisting of:
optical surface attribute values; shadowing and occlusion attribute values; noise surface attribute values; simulation attribute values; geometric attribute values; illumination surface attribute values; modeling surface attribute values; and rendering surface attribute values.

11. The method of claim 1, wherein the surface attribute function includes surface attribute values are selected from a group consisting of:
artistically generated surface attribute values; procedurally generated surface attribute values; and surface attribute values generated using the output of a rendering operation.

12. The method of claim 1, further comprising:
determining a plurality of intermediate locations in the first surface region between the first sample point locations;
determining a plurality of intermediate values of the surface attribute function at the intermediate locations using the first sample point values in the first portion of the cache; and
rendering the first surface using the plurality of intermediate values.

13. A method of caching a value of a function associated with a surface, the method comprising:
receiving a first surface associated with a surface attribute function;
defining a plurality of sampling resolution levels associated with the surface, wherein each sampling resolution level includes at least one surface region;
for each sampling resolution level, defining first sample point locations at the corners of each surface region included in the sampling resolution level;
for each sampling resolution level, sampling the surface attribute function at each of the first sample point locations using filter kernels to determine sample point values; and
storing the sample point values for each sampling resolution level in a first portion of a multiresolution cache;
wherein at least a first sampling resolution level and a second sampling resolution level of the sampling resolution levels have an equal number of sample point locations and the sample point locations of the first sampling resolution level are associated with first filter kernels having different filter areas than second filter kernels associated with the sample point locations of the second sampling resolution level.

14. The method of claim 13, wherein the first filter kernels have a first spatial frequency limit and the second filter kernels have a second spatial frequency limit less than the first spatial frequency limit.

15. The method of claim 13, wherein the filter kernels include weightings of the surface attribute function based on geodesic distances on the first surface from each of their respective sample point locations.

16. The method of claim 13, wherein each of the sampling resolution levels is associated with a level of detail value based on a derivative of the object space position with respect to a screen space coordinate system.

17. The method of claim 13, further comprising:
storing at least one measurement of geodesic distance between the associated sample point location and an adjacent sample point location.

18. The method of claim 13, wherein the first sampling resolution level and second sampling resolution level each include four sample point locations.

19. The method of claim 13, wherein sampling comprises:
determining if at least one of the sample point locations is adjacent to at least a second surface;
in response to the determination that the one of the sample point locations is adjacent to the second surface, sampling a second surface attribute function associated with the second surface using a portion of the filter kernel associated with the one of the sample point locations, wherein the portion of the first filter kernel extends outside the first surface.

20. The method of claim 19, further comprising:
determining a plurality of intermediate locations in the first surface region between the first sample point locations;
determining a plurality of intermediate values of the surface attribute function at the intermediate locations using the first sample point values in the first portion of the cache wherein determining each of the plurality of intermediate values comprises combining a plurality of nearby first sample point values; and
rendering the first surface using the plurality of intermediate values, wherein second sample point values for the second surface are stored in a second part of the cache, wherein rendering the first surface does not use the second part of the cache.

21. The method of claim 13, wherein the surface attribute function includes an arrangement of M by N discrete sample point values, wherein M and N are positive integers, and at least one of the sampling resolution levels includes a M+1 by N+1 arrangement of the sample point locations.

22. The method of claim 13, wherein the sample point values are stored in the first portion of the multiresolution cache in association with a first local surface coordinate system defined by the first surface, wherein the first local surface coordinate system is independent of at least a second local surface coordinate system used to store additional sample point values in a second portion of the multiresolution cache.

23. The method of claim 13, wherein the first surface is selected from a group consisting of:
a polygon mesh surface; a subdivision hierarchy of meshes converging at its limit to a subdivision surface; an implicit surface defined by an isosurface of a second function; a point set surface defined by a set of points; and a fractal surface.

24. The method of claim 13, wherein the surface attribute function includes surface attribute values selected from a group consisting of:
- optical surface attribute values; shadowing and occlusion attribute values; noise surface attribute values; simulation attribute values; geometric attribute values; illumination surface attribute values; modeling surface attribute values; and rendering surface attribute values.

25. The method of claim 13, wherein the surface attribute function includes surface attribute values are selected from a group consisting of:
- artistically generated surface attribute values; procedurally generated surface attribute values; and surface attribute values generated using the output of a rendering operation.

26. The method of claim 25, wherein determining each of the plurality of intermediate values comprises combining a plurality of nearby first sample point values.

27. The method of claim 25, wherein second sample point values for the second surface are stored in a second part of the cache, wherein rendering the first surface does not use the second part of the cache.

\* \* \* \* \*

UNITED STATES PATENT AND TRADEMARK OFFICE
CERTIFICATE OF CORRECTION

| | | |
|---|---|---|
| PATENT NO. | : 9,007,388 B1 | Page 1 of 1 |
| APPLICATION NO. | : 13/190469 | |
| DATED | : April 14, 2015 | |
| INVENTOR(S) | : Robert L. Cook et al. | |

It is certified that error appears in the above-identified patent and that said Letters Patent is hereby corrected as shown below:

On the Title Page

Item (74), subsection, Attorney, Agent or Firm,

Please delete "Kikpatrick Townsend Stockton LLP"; and
    Please insert --Kilpatrick Townsend Stockton LLP--.

Signed and Sealed this
Eleventh Day of August, 2015

Michelle K. Lee
*Director of the United States Patent and Trademark Office*